US012765512B2

(12) United States Patent
Busbice et al.

(10) Patent No.: US 12,765,512 B2
(45) Date of Patent: Oct. 20, 2026

(54) ANIMAL FEEDER SYSTEM WITH ROTATING SPRING AGITATING AUGER

(71) Applicant: DEADFALL LLC, Peru, IL (US)

(72) Inventors: Matt Busbice, Baton Rouge, LA (US); Christopher Paul Bishop, Broussard, LA (US)

(*) Notice: Subject to any disclaimer, the term of this patent is extended or adjusted under 35 U.S.C. 154(b) by 0 days.

(21) Appl. No.: 18/742,781

(22) Filed: Jun. 13, 2024

(65) Prior Publication Data

US 2024/0415093 A1 Dec. 19, 2024

Related U.S. Application Data

(60) Provisional application No. 63/507,923, filed on Jun. 13, 2023.

(51) Int. Cl.
*A01K 5/02* (2006.01)

(52) U.S. Cl.
CPC .......... *A01K 5/0258* (2013.01); *A01K 5/0225* (2013.01)

(58) Field of Classification Search
CPC .................................................... A01K 5/0225
See application file for complete search history.

(56) References Cited

U.S. PATENT DOCUMENTS 2,228,421 A * 1/1941 Taylor .................... B65D 88/68 15/104.14
2,561,258 A * 7/1951 Wolf ...................... B65D 88/68 222/406
3,038,643 A * 6/1962 Van Der Lely ........ B65D 88/68 366/276
3,223,290 A * 12/1965 Schuld ................. A01K 5/0225 366/186
3,251,512 A * 5/1966 Irving .................... B65D 88/68 222/413
3,424,350 A * 1/1969 Herr .................... A01F 25/2018 222/240
3,602,394 A * 8/1971 McCune ................ B65D 88/68 406/135
3,907,131 A * 9/1975 Lepley ................... B65D 88/68 414/324
3,942,656 A * 3/1976 Lepley ................ B01F 27/0542 414/325
4,171,165 A * 10/1979 Card ....................... B01F 35/79 366/186
4,330,091 A * 5/1982 Rozeboom .......... B01F 27/0541 241/101.8
4,611,921 A * 9/1986 Patel ....................... B01F 35/79 366/186
4,957,404 A * 9/1990 Lepley ................ B01F 27/0542 222/240
5,348,195 A * 9/1994 Pajot .................. B65G 65/4836 222/227

(Continued)

OTHER PUBLICATIONS

International Search Report and Written Opinion for PCT/US2023/011751 dated May 2, 2023 (16 pages).

*Primary Examiner* — Jessica B Wong
(74) *Attorney, Agent, or Firm* — Smith Keane LLP

(57) ABSTRACT

A animal feeder system includes a housing assembly, a drive assembly, and an agitation assembly, whereby the agitation assembly agitates feed within the housing assembly when the drive assembly is actuated. Further, when the drive assembly is agitated, feed is dispensed from the housing assembly through a lower opening.

9 Claims, 19 Drawing Sheets

(56) References Cited

U.S. PATENT DOCUMENTS

| | | | | |
|---|---|---|---|---|
| 8,833,303 | B1 * | 9/2014 | Linder | A01K 5/0225 119/57.91 |
| 8,833,304 | B2 * | 9/2014 | Whitsett | A01K 5/02 119/57.92 |
| 9,301,495 | B1 * | 4/2016 | Bogart | A01K 5/005 |
| 9,481,511 | B2 * | 11/2016 | Yu | B01F 27/073 |
| 9,700,014 | B1 * | 7/2017 | Bogart | A01K 5/0225 |
| 10,314,289 | B1 | 6/2019 | Harding | |
| 10,743,518 | B2 * | 8/2020 | Knight | A01K 5/0225 |
| 11,116,185 | B2 * | 9/2021 | Pfeiff | A01K 5/02 |
| 2013/0180456 | A1 * | 7/2013 | Whitsett | A01K 5/02 119/57.92 |
| 2015/0334989 | A1 * | 11/2015 | Morris | A01K 5/02 119/57.91 |
| 2017/0006825 | A1 * | 1/2017 | Knight | A01K 5/0258 |
| 2017/0071153 | A1 * | 3/2017 | Stanley | A01K 61/80 |
| 2020/0045942 | A1 * | 2/2020 | Pfeiff | A01K 5/0225 |
| 2021/0000071 | A1 | 1/2021 | Hill | |
| 2021/0204509 | A1 | 7/2021 | Staples et al. | |

* cited by examiner

FIG. 11B
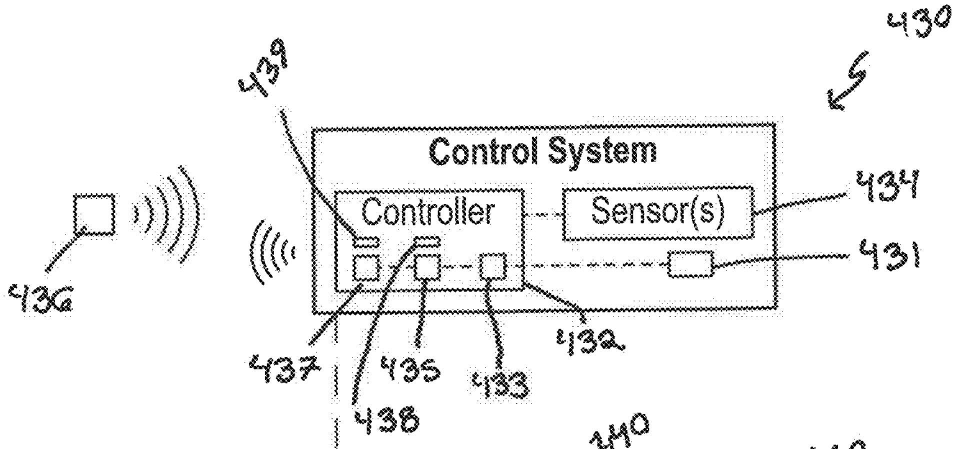
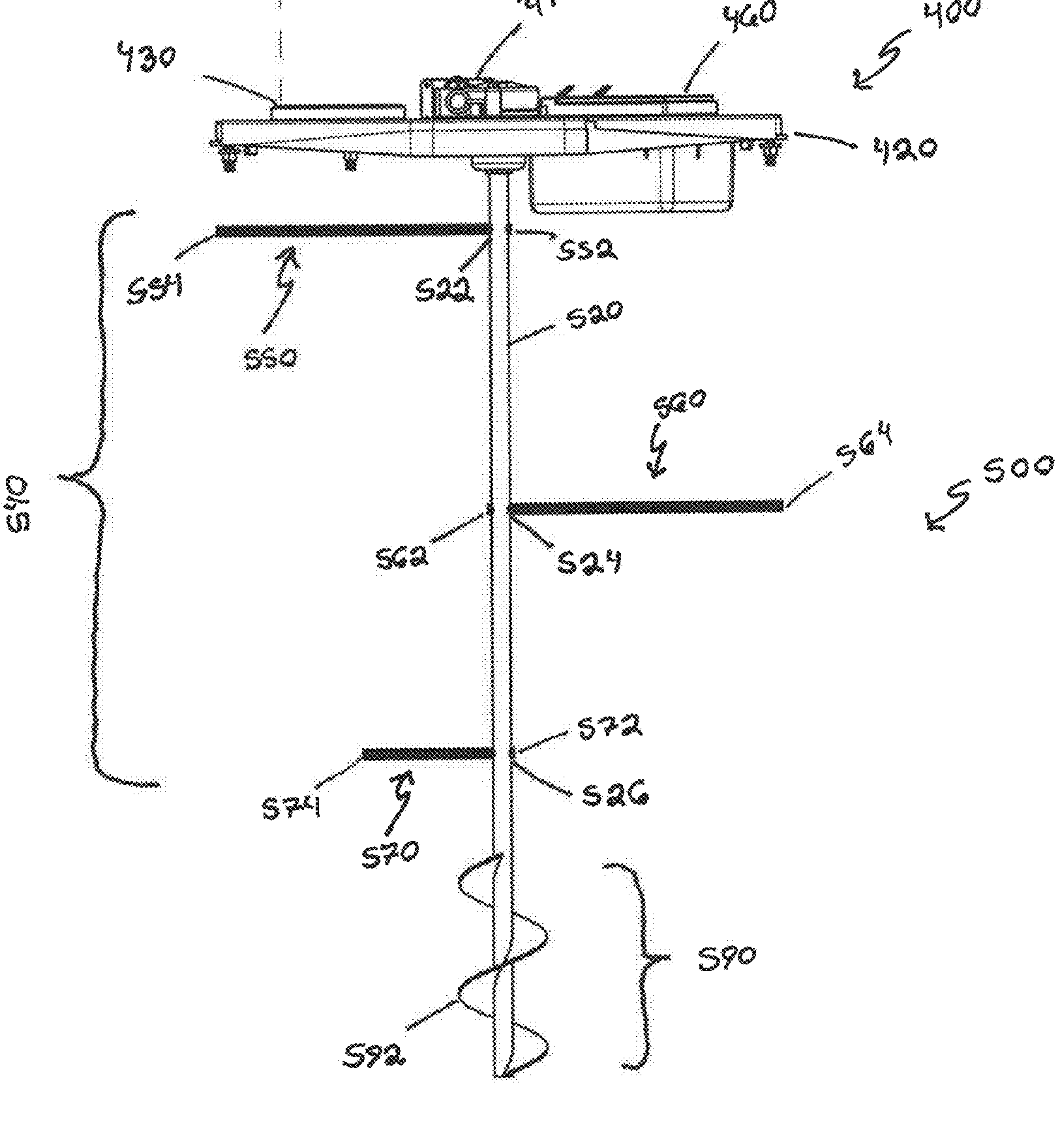
FIG. 11A

FIG. 12A
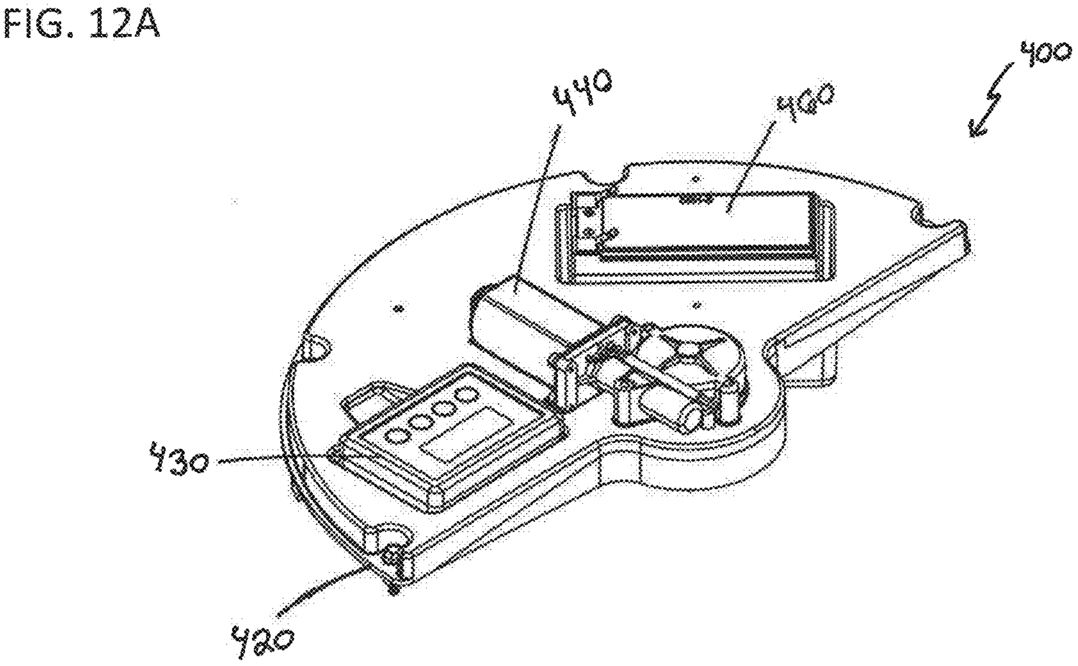
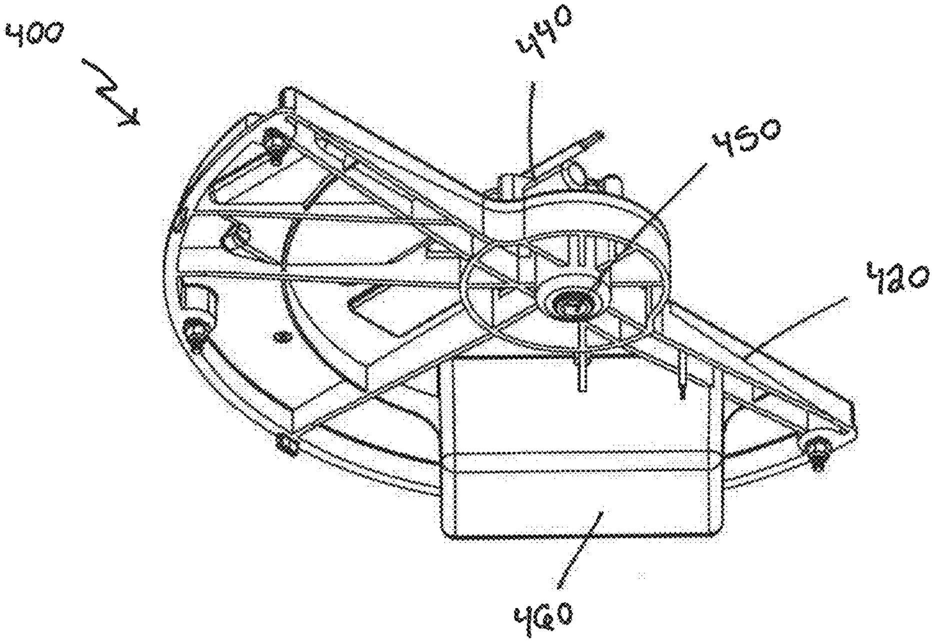
FIG. 12B

FIG. 15
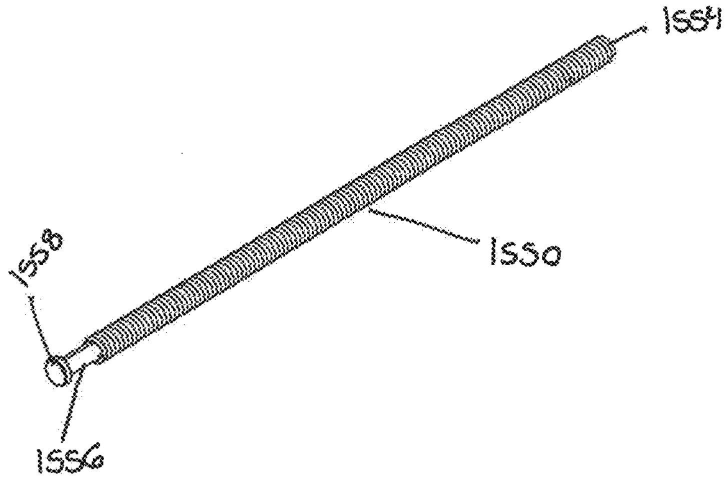
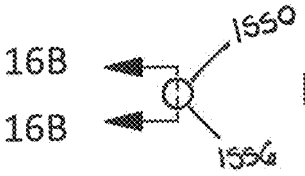
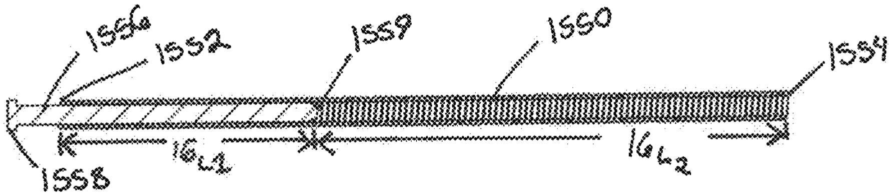
FIG. 16A
FIG. 16B
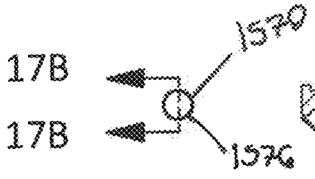
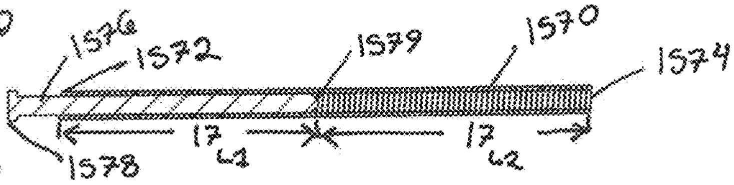
FIG. 17A
FIG. 17B
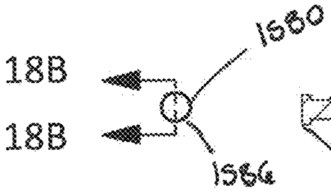
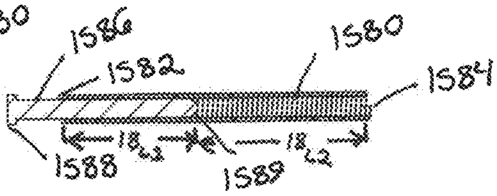
FIG. 18A
FIG. 18B FIG. 19A
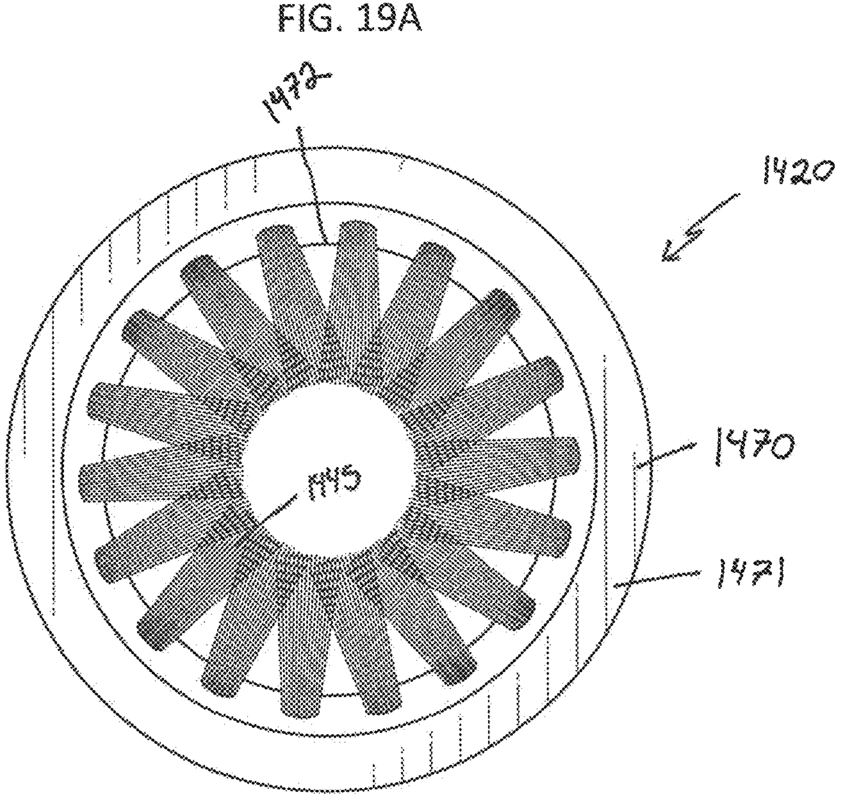
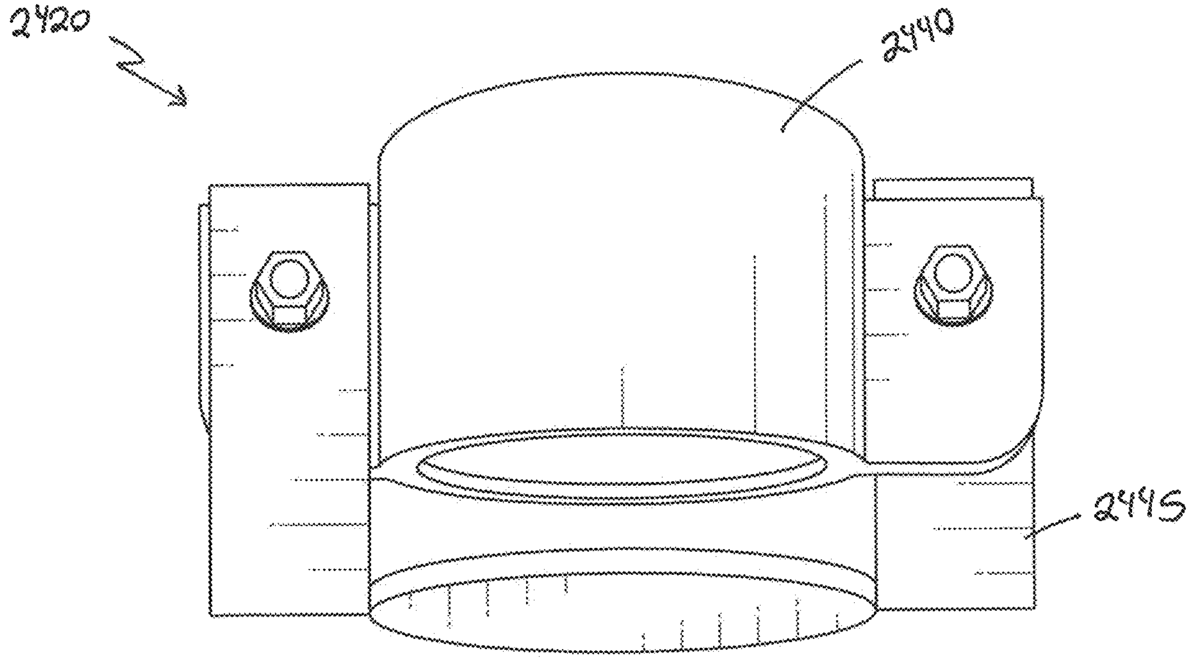
FIG. 19B

ANIMAL FEEDER SYSTEM WITH ROTATING SPRING AGITATING AUGER

CROSS REFERENCE TO RELATED APPLICATION

This application claims priority to U.S. Provisional Application Ser. No. 63/507,923, filed Jun. 13, 2023, the disclosure of which is hereby incorporated by reference in its entirety for all purposes.

TECHNICAL FIELD

The present disclosure relates to an animal feeder system, such as a game animal, having a housing assembly with a storage chamber for animal feed and a dispensing mechanism, whereby driven spring arms of an agitation assembly are found within the storage chamber, and the agitation assembly is operated by a drive assembly subject to a control assembly. The inventive animal feeder system prevents (i) feed from clumping together during extended feeding sessions (ii) unscheduled, uncontrolled feeding, (iii) water and/or moisture from penetrating or migrating into the storage housing and damaging the feed therein, and, (iv) an undesirable, un-preferred animal from breaching the housing to gain access to the feed.

BACKGROUND

Animal feeders, including automatic animal feeders, are known in the art and are designed to attract certain animals to the immediate area where the feeder is located. Conventional automatic feeders suffer from a number of limitations that negatively impact their utility, durability, and functionality. For example, conventional feeders do not reliably limit access to feed during pre-determined time periods. In addition, conventional feeders are poorly designed and/or constructed and thereby are prone to allow water (e.g., rain) or moisture (e.g., humidity) into the feeder which damages the feed stored therein. This damage can lead to rotting or destruction of the feed, which will deter the desired game from utilizing the feeder. Conventional feeders are also designed in a manner that makes them visually obvious to the game animal, which also deters the game animal from utilizing the feeder. Consequently, conventional automatic feeders do not effectively "train" animals to consistently return to the feeder where the hunter is situated.

The inventive animal feeder system addresses the shortcomings and limitations discussed above and other problems, while providing advantages and aspects not contained by prior art animal feeders. A full discussion of the features and advantages of the present disclosure is deferred to the following detailed description, which proceeds with reference to the accompanying drawings.

SUMMARY OF THE INVENTION

The present disclosure is directed to an animal feeder system that provides controlled feeding for an animal. The animal feeder system includes (i) a housing defining a feed storage chamber, (ii) a drive assembly, and (iii) an agitation assembly. The feed storage chamber is configured to accept animal feed (e.g., corn). The drive assembly includes (i) a drive frame, (ii) a drive motor, (iii) a driveshaft coupler, and (iv) a controller. The drive assembly, operated by the controller, actuates the drive motor, which is coupled to the agitation assembly by the driveshaft coupler. The agitation assembly includes (i) a driveshaft, (ii) a plurality of spring arms, and (iii) an auger assembly. When the drive motor is actuated to rotate the drive shaft, the spring arms of the agitation assembly agitate feed to arrest feed adhesion, while the auger assembly rotates to dispense feed beneath the housing to a desired, preferred animal (DPA).

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTIONS OF THE DRAWINGS

The detailed description particularly refers to the accompanying figures in which:

FIG. 11A is a front view of the agitation assembly and the drive assembly of FIG. 8;

FIG. 11B is a schematic diagram of a control system of the drive assembly of FIG. 11A;

FIG. 12A is an upper perspective view of the drive assembly of FIG. 8;

FIG. 12B is a lower perspective view of the drive assembly of FIG. 8;

FIG. 15 is a perspective view of a spring arm and a spring arm support of the alternative agitation assembly of FIG. 14A;

FIG. 16A is an end view of a first spring arm and a first spring arm support of the alternative agitation assembly of FIG. 14A;

FIG. 16B is a cross-sectional view of the first spring arm and the first spring arm support of FIG. 16A;

FIG. 17A is an end view of a third spring arm and a second spring arm support of the alternative agitation assembly of FIG. 14A;

FIG. 17B is a cross-sectional view of the third spring arm and the third spring arm support of FIG. 17A;

FIG. 18A is an end view of a fourth spring arm and a fourth spring arm support of the alternative agitation assembly of FIG. 14A;

FIG. 18B is a cross-sectional view of the fourth spring arm and the fourth spring arm support of FIG. 18A;

FIG. 19A is a first alternative embodiment of a feed dispensing nozzle;

FIG. 19B is a second alternative embodiment of a feed dispensing nozzle.

DETAILED DESCRIPTION

Figure 1:
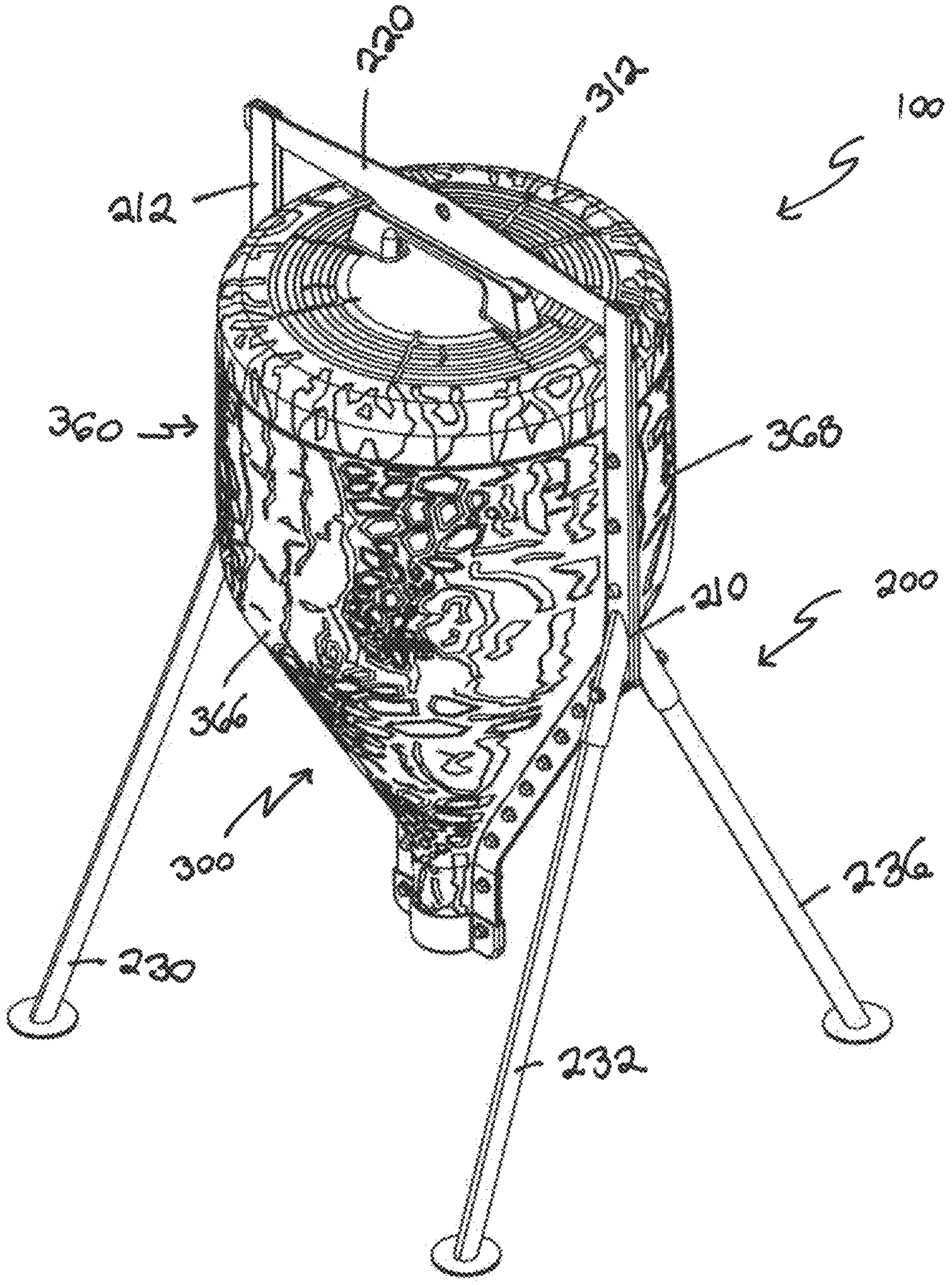
FIG. 1 is a perspective view of an animal feeder system.

In the following detailed description of the animal feeder system 10, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed animal feeder system 100 and the operational methods of same are capable of other and different configurations and several details are capable of being modified all without departing from the scope of the disclosed methods and systems. For example, one or more of the following embodiments of the animal feeder system 100, in part or whole, may be combined consistent with the disclosed methods and systems. As such, one or more steps from the operation of the feeder 100 or components of the feeder 100, including those shown in the Figures, may be selectively omitted and/or combined consistent with the disclosed methods and systems. Accordingly, the drawings, flow charts and detailed descriptions are to be regarded as illustrative in nature, not restrictive or limiting.

A. Overview

An animal feeder system 100 includes a housing assembly 300 defining a feed storage chamber 305, and further houses a drive assembly 400 and agitation assembly 500, configured to dispense feed through a lower opening 302 to a desired, preferred animal (DPA). The drive assembly 400 connects to agitation assembly 500 to rotate agitation assembly 500, which simultaneously agitates feed F in the feed storage chamber 305 to discourage "clumping" or "adhering" of feed F to itself or internal components of said system 100, and further driving an auger assembly 590. The auger assembly 590 rotates within a lower portion 340 of the housing assembly 300 to disperse feed F through a nozzle 344. Unlike conventional animal feeders, this animal feeder system 100 prevents (i) feed from clumping together during extended feeding sessions (ii) unscheduled, uncontrolled feeding, (iii) water and/or moisture from penetrating or migrating into the storage housing and damaging the feed therein, and, (iv) an undesirable, un-preferred animal (UUA) from breaching the housing to gain access to the feed.

B. Support Frame and Housing Assemblies

The animal feeder system 100 includes a housing assembly 300 supported by a support frame assembly 200. The housing assembly 300 is configured to package and protect both the feed F to be dispensed by the animal feeder system 100, and the mechanisms for dispensing feed F to include drive assembly 400 and the agitation assembly 500 actuated by drive assembly 400. Additionally, the support frame assembly 200 is configured to suspend the housing assembly 300, and thus the components and feed F within that housing assembly 300, off of a support surface such as the ground, allowing feed F to be dispensed from the housing assembly 300 and gravitationally driven toward the support surface such as the ground.

The housing assembly has a side wall arrangement 360 which defines an interior feed storage chamber 305, where animal feed is stored to be dispersed to a DPA. This side wall arrangement 360 includes first and second walls 366 and 368, as shown in FIG. 1, which are topped off by a lid 312. In alternative embodiments, the first and second side walls 366 and 368 may be integrally formed into a single side wall, or the side walls 366, 368 may be split into a plurality of side walls, wherein said housing assembly 300 includes between 3 and 10 side walls.

Lid 312 forms a seal with the first and second side walls 366 and 368, such that interior feed storage chamber 305 is protected from the elements, and from incursions by either a DPA, or an undesirable, unpreferred animal (UUA). The lid 312 is held in place by the upper frame component 220 through a recess 313*c* in the handle 313 of the lid 312. A recess 312*c* is formed in an upper extent of the side walls 366, 368 to receive an extent of the lid 312, wherein said recess 312*c* allows the outer surface of the lid 312 to be substantially aligned a portion of the outer surface of the side walls 366, 368. To remove lid 312 in the illustrated embodiment, upper frame component 220 is vertically displaced away from the housing assembly 300, allowing for the removal of lid 312. The combination of the frame component 220 and the lack of a threaded lid 312 provides a substantial benefit, as the feeder system 100 is intended primarily for outdoor use and threaded components (e.g., the lid 312 sticking to side walls 366, 368) are liable to stick together with changes in temperature and humidity in the surrounding environment. While it is desirable to utilize the described coupling mechanism for the lid 312, it should be understood that in other embodiments, the lid 312 may removably coupled to the sidewalls 366, 368 using threads, external deformable couplers, bolts, or other fastening means.

As shown in at least FIGS. 1-6, these first and second side walls 366 and 368 can include a texturing or pattern. Said texture or pattern may be integrally formed with the side walls 366, 368 or may be formed in or on a separate component that is attached to the side walls 366, 368. While a single texture or pattern is shown in the Figures, it should be understood that other textures or patterns are contemplated by this disclosure. The use of said texture or pattern is desirable because it may allow the animal feeder system 100 to blend in with its environment, such as an outdoor wooded area, which will increase the probability that animals will accept feed F from said system 100. In at least some alternative embodiments, a texturing or pattern may be omitted. Further, the housing assembly may be produced from various plastics using process such as injection molding, or fashioned from metals to include rolled sheet metal embodiments.

Figure 2:
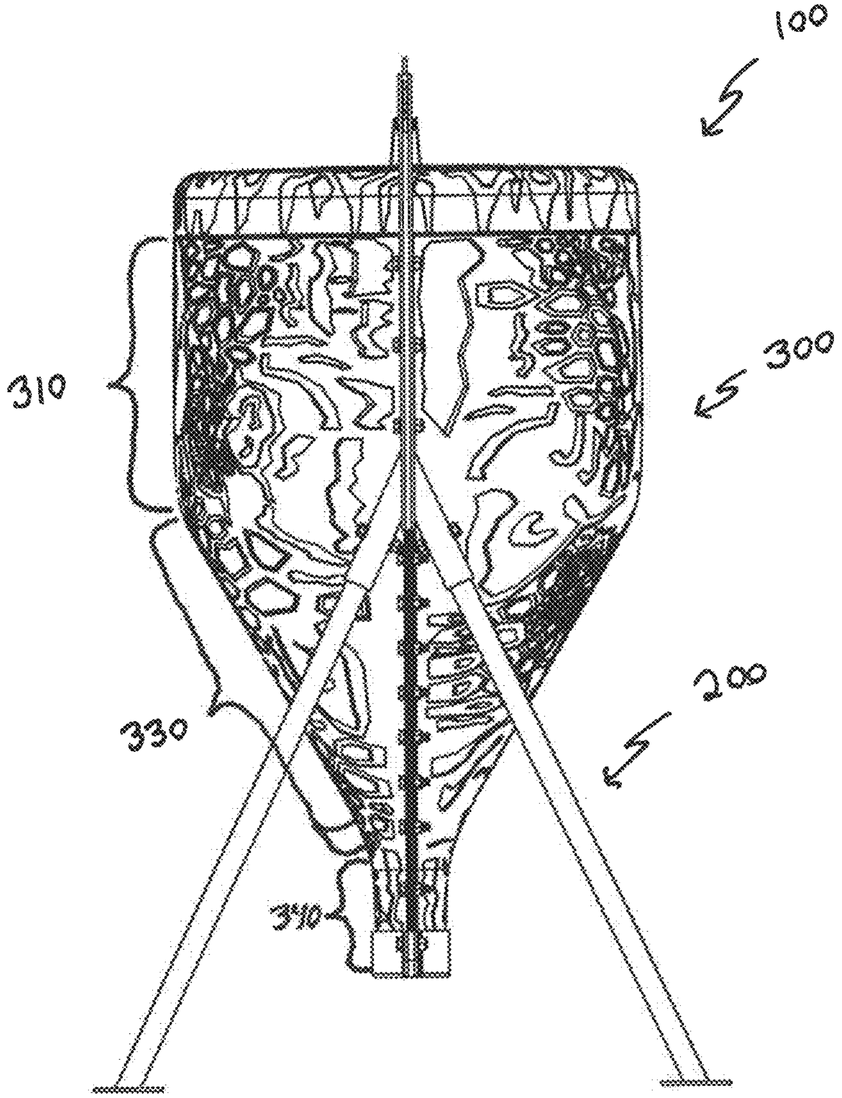
FIG. 2 is a side view of the animal feeder system of FIG. 1.
Figure 3:
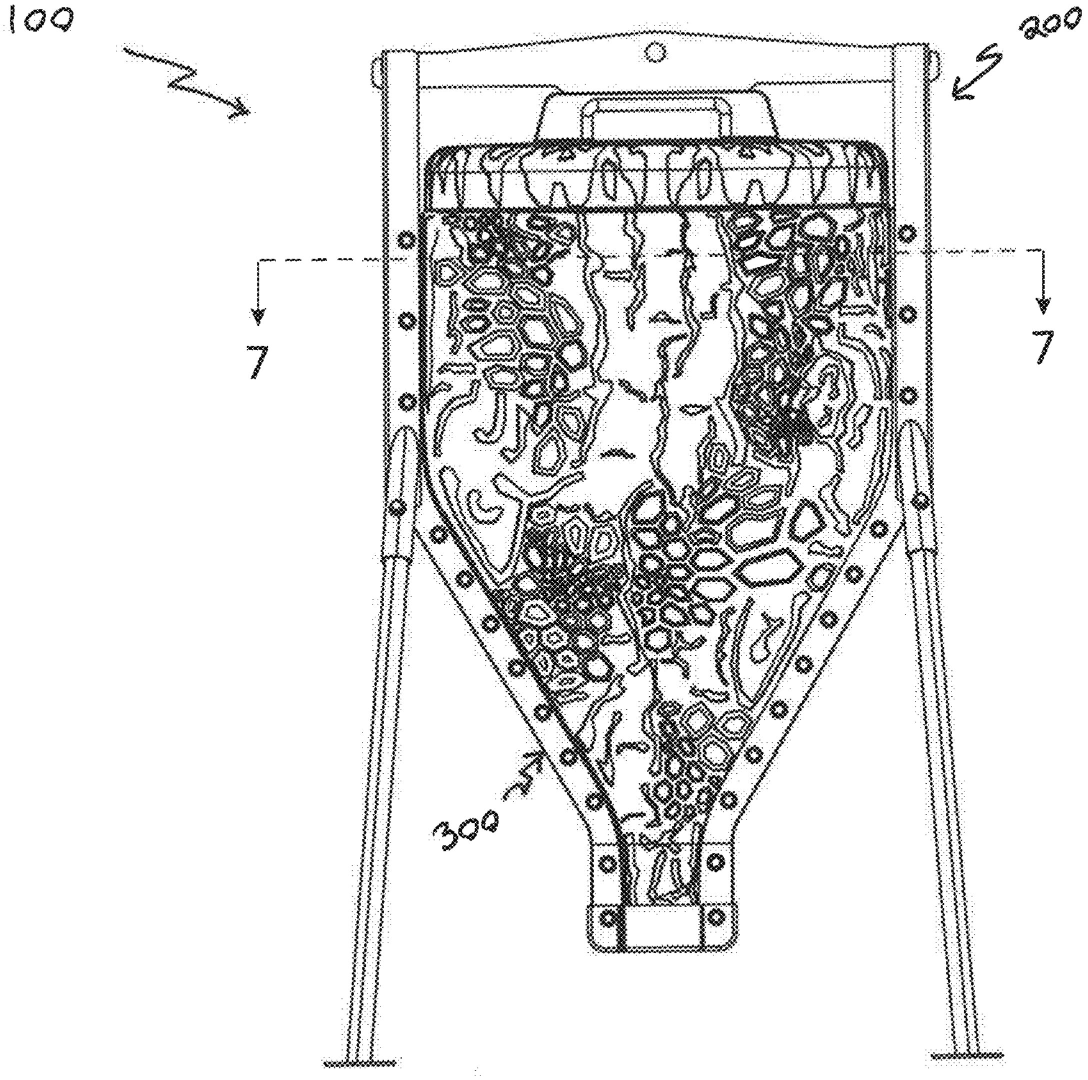
FIG. 3 is a front view of the animal feeder system of FIG. 1.
Figure 4:
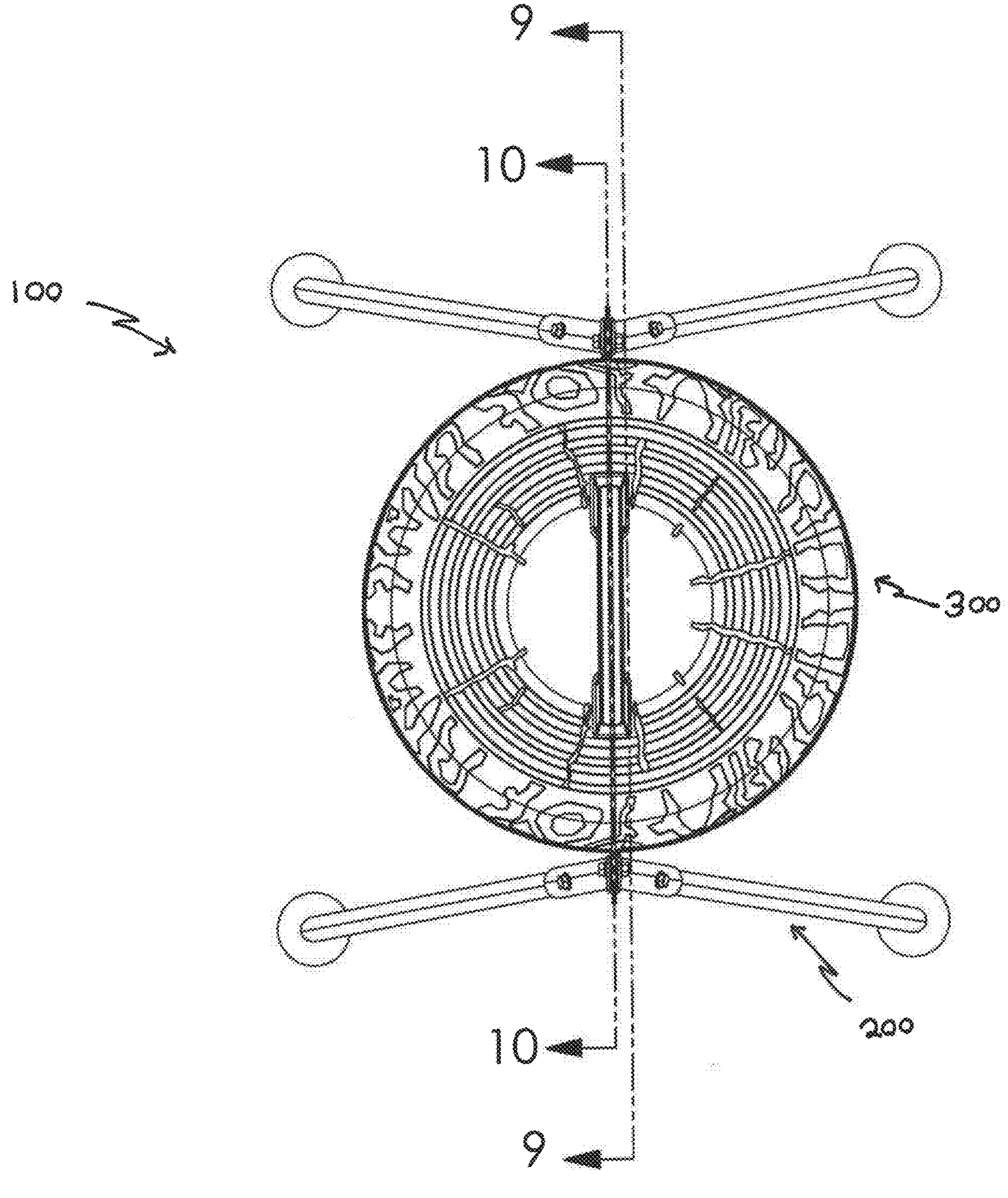
FIG. 4 is a top view of the animal feeder system of FIG. 1.

As depicted in each of FIGS. 1-6, the wide wall arrangement 360 has a substantially curved cross-section, forming a feed storage chamber 305 that tapers toward a dispensing outlet assembly 342. This tapering shape results in the housing assembly having three primary portions; an upper portion 310, middle portion 330, and lower portion 340, as illustrated in FIG. 2, and further detailed in the section views of FIGS. 9 and 10A. In the illustrated embodiment, the upper portion 310 and lower portion 340 are each substantially cylindrical, though the diameter of the lower portion 340 is smaller than that of the upper portion 310. The middle portion 330 is thus tapered to connect these two portions, and is substantially frustoconical. This frustoconical taper of the middle portion 330 in the illustrated embodiment assists to force feed F contained within feed storage chamber 305 downward toward a lower opening 302 in the lower portion 340 of the housing assembly 300.

An upper opening 301 is formed in the upper portion 310 of the housing assembly 300, forming the top of feed storage chamber 305, while a lower opening 302 is formed in the lower portion 340 of the housing assembly 300 at the bottom of feed storage chamber 305 in order to allow the feed F to be dispensed from the housing assembly 300. The upper opening 301 has a significantly greater diameter than the lower opening 302, such that in at least some embodiments the diameter of the upper opening 301 is at least five times that of lower opening 302. However, depending on the ultimate shape of the housing assembly 300 and corresponding storage chamber 305, the ratio of the diameter of the upper opening 301 to the diameter of the lower opening 302 may be anywhere from 1:1 to 100:1.

Figure 5:
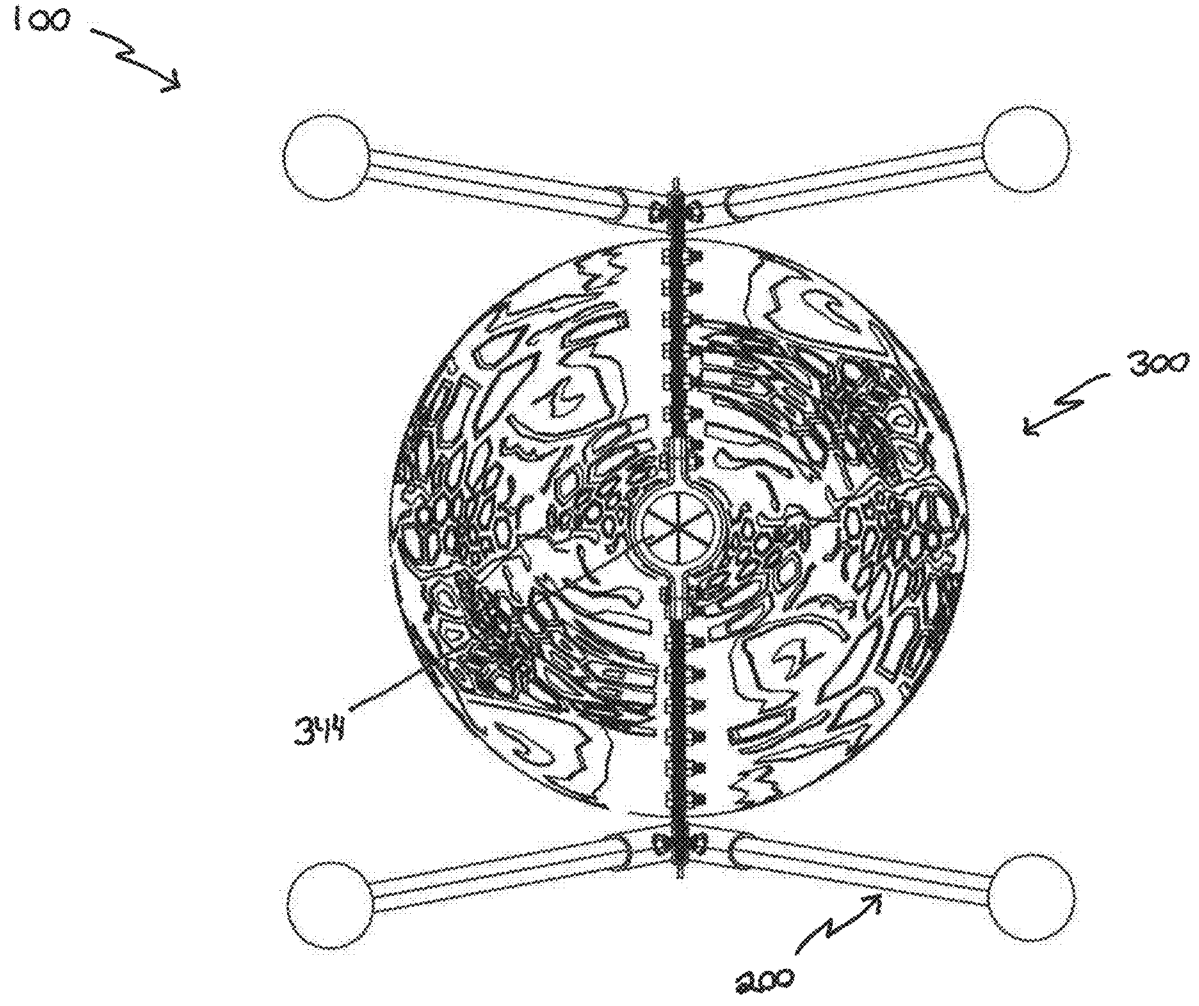
FIG. 5 is a bottom view of the animal feeder system of FIG. 1.
Figure 8:
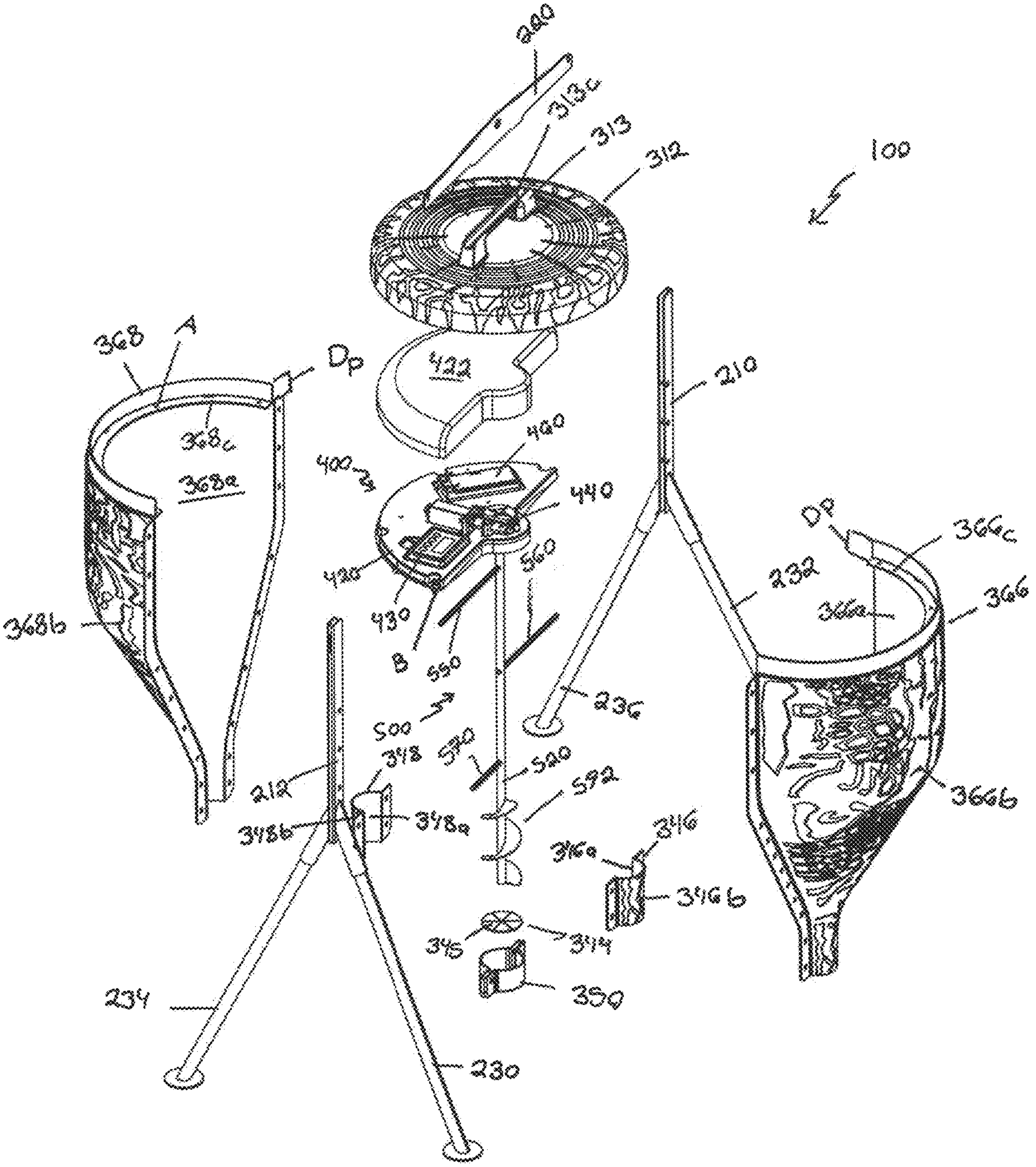
FIG. 8 is an exploded view of the animal feeder of FIG. 1, showing a housing assembly, a suspension assembly, an agitation assembly, and a drive assembly.

As shown in FIGS. 5 and 8, the lower opening 302 is at least partially obscured by dispensing outlet assembly 342, and in particular nozzle 344 of dispensing outlet assembly 342. Nozzle 344 is held in place by a nozzle frame formed from first and second nozzle frame components 346 and 348, which have respective inner and outer surfaces 346(*a*), 346(*b*) and 348(*a*), 348(*b*). Nozzle 344 is further secured by nozzle cap 350. Nozzle 344 includes a plurality of deformable triangular members 345, each of which are sufficiently firm so as to discourage incursion of animals and debris from incursion into the feed storage chamber 305. When feed is dispensed through the lower opening 302 and thus through nozzle 344, the deformable triangular members of nozzle 344 temporarily deform to allow feed to pass through opening 302, before returning to their natural position. According to at least some embodiments, the deformable members of a nozzle can be of other shapes suitable to obscure the lower opening 302, such as rectangular or trapezoidal shapes. In other embodiments the nozzle may take the form of a slit.

To form an animal feeder system 100 which is displaced from a support surface such as the ground, these first and second side walls 366 and 368 are affixed to a support frame assembly 200. As shown in at least FIGS. 1-6, the support frame assembly includes first and second vertical frame components 210 and 212, which are attached to the first and second side walls 366 and 368 of the housing assembly 300. In the illustrated embodiment, these attachments utilize a plurality of bolts B; however, other attachments such as hooks, pins, clips, or even integrally forming such together components by way of example, are contemplated herein. These first and second vertical frame components 210 and 212 are attached in the illustrated embodiments to support legs 230, 232, 234, and 236, and are further connected to one another by upper frame component 220. According to several embodiments, an angle that is between 30 degrees and 110 degrees is formed between corresponding pairs of support legs 230, 234, and 232, 236. Further, a distance between corresponding pairs of support legs 230, 234, and 232, 236 is about the same size as the diameter of the upper portion 310 of the housing. In an alternative embodiment, the distance may be substantially larger, up to or exceeding 150% of the diameter of the upper portion 310 of the housing assembly 300.

According to at least some alternative embodiments of a housing assembly 300, the housing assembly 300 may generally take the shape of a cone, pyramid, or any other similar shape that has an opening for insertion of feed F and an outlet in a lower portion 340, wherein the diameter of the upper portion 310 of the housing assembly 300 is greater than the diameter of the lower portion 340 of the housing assembly 300. According to at least some alternative embodiments of a support frame assembly 200, the support frame assembly can take the form of a single post, have more than four legs (or any number of legs between 3 and 10), be capable of being mounted to a tree or other existing vertical support structure, or have apertures, hooks, or other securing points for suspension via a rope, cable, chain, or strap.

The feed storage chamber 305 within housing assembly 300 can hold approximately 40 gallons of feed. However, in some configurations based on the housing assembly 300 and feed storage chamber 305, the feed storage chamber may hold as few as 5 gallons of feed, or as many as 100 gallons of feed. In some configurations, the housing assembly has an approximate height of 3 feet, and the distance from the lower opening 302 to the support surface or ground is approximately 2 feet. However, smaller configurations are contemplated, such as a distance of only 6 inches to the ground, and in other larger configurations there may be as much as 6 feet to the ground. In hanging configurations, the lower opening may be as many as 20 feet from the support surface or ground. Further, the approximate height of the housing assembly may be as little as 1 foot in smaller embodiments, and as large as 10 feet in larger embodiments. The feed storage chamber may hold several types of feed such as feed based in corn, oats, beans, or grain based pellets.

C. Drive Assembly

Figure 9:
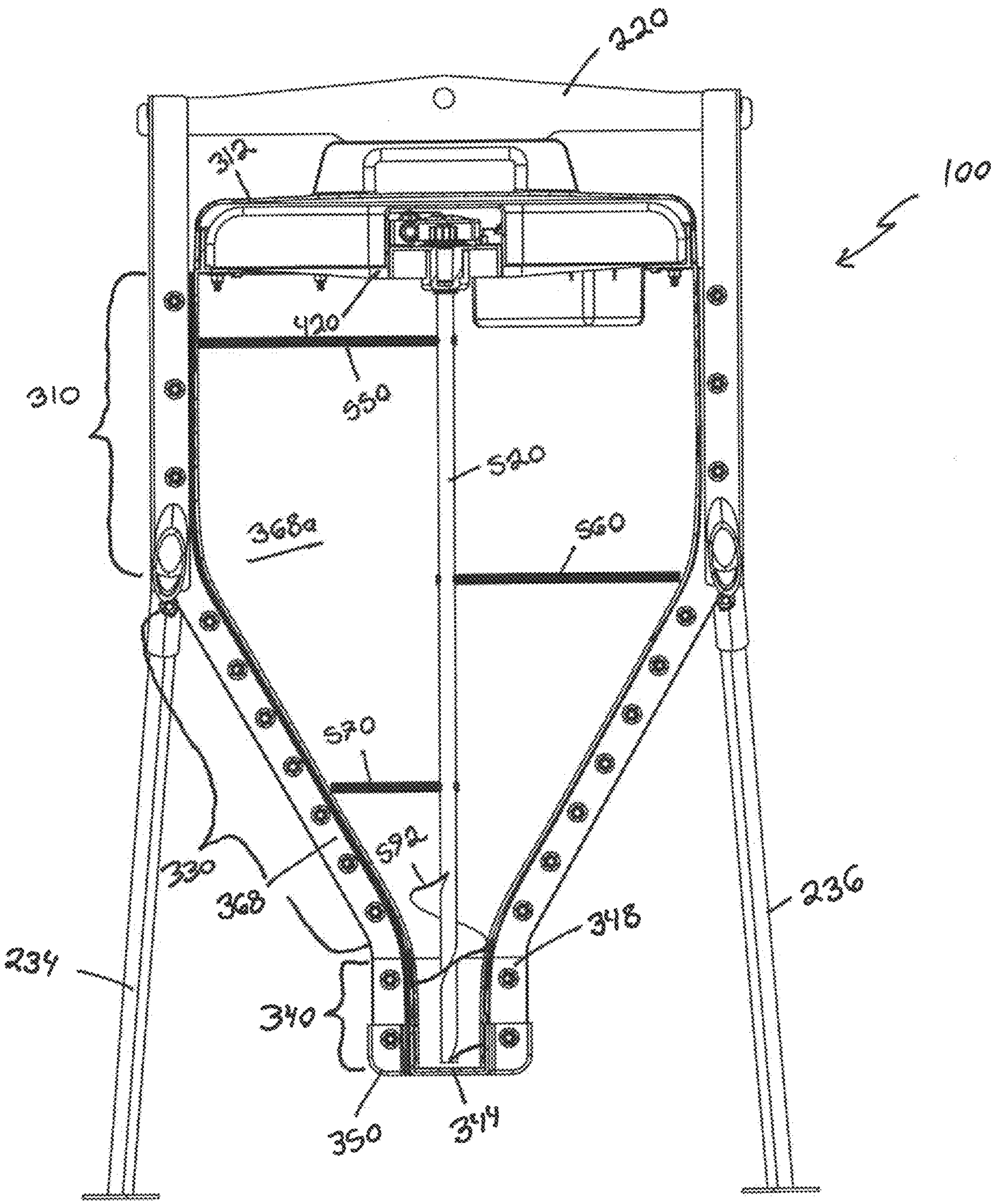
FIG. 9 is a cross-sectional view taken along line 9-9 of FIG. 4, showing the agitation assembly nested within the housing assembly.

Within the housing assembly 300 of the animal feeder system 100 is a drive assembly 400, as shown in each of FIGS. 9 and 10. This drive assembly is shown isolated from the housing assembly 300, and from the agitation assembly 500 which is driven by drive assembly 400 in operation, in each of FIGS. 12A and 12B. The drive assembly is configured to actuate a drive motor 440 within the drive assembly 400, such that the drive motor 440 can rotate the agitation assembly 500, resulting in feed F being dispensed out of the lower portion 340 of the housing assembly 300.

The drive assembly 400 is supported by a drive frame 420, anchoring the remaining components of the drive assembly 400 and further connecting the drive assembly 400 to the side wall arrangement 360. The drive frame 420 facilitates this connection such that the drive assembly 400 remains stationary with respect to side wall arrangement 360 when the feeder system 100 is in operation. By way of example in the illustrated embodiments, the drive frame 420 is affixed to second wall 368 of side wall arrangement 360 by a plurality of bolts B fed through apertures A. These apertures A are positioned about inward projections 366*c* and 368*c* of first and second side walls 366 and 368 respectively within the upper portion 310 of the housing assembly 300, at a suitable depth $D_P$ from the upper edge of first and second side walls 366, 368. This depth $D_P$ allows for the drive assembly 400 to be positioned under the lid 312 when said lid 312 is attached to the housing assembly 300. assembled according to the instructive exploded view of FIG. 8. The section view of FIG. 9 shows the drive frame 420 in an assembled configuration relative to second wall 368.

Within the drive frame 420 are a plurality of operative driving components, including a drive motor 440, control assembly 430, and battery 460, as shown in FIG. 12A. Battery 460 provides electrical power to drive motor 440, which includes a driveshaft coupler 450 shown in FIG. 12B to connect to a driveshaft 520 of an agitation assembly 500, as detailed below and shown in at least FIGS. 8, 9, 10A, and 11A. In alternative embodiments, the battery 460 may be replaced with a solar panel or an external DC or AC power source (e.g., power from an extension cable).

Drive motor 440 is operatively connected to control assembly 430, schematically illustrated in FIG. 11B, to receive commands therefrom to actuate drive motor 440. In one embodiment, the control system 430 includes a timer 470 and the control system 430 is configured to activate the drive motor 440 in response to the timer 470 reaching a predetermined threshold/time. For example, the timer 470 can be programmed by a user to activate the drive motor 440 at sunrise and again at sunset to train animals to feed only during the day when hunting is permitted by local ordinances, rules and/or regulations. The timer 470 may be programmed with any feeding interval(s)—namely, one interval a day that last a pre-determined or set amount of time (e.g., 10 minutes, 1 hour, 5 hours, or any other known interval), or multiple times (e.g., between 2 and 100) a day that last a pre-determined or set amount of time (e.g., 10 minutes, 1 hour, 5 hours, or any other known interval) over a pre-set duration (e.g., 12 hours).

Referring again to FIG. 11B, in some embodiments of the animal feeder system 100, the control system 430 may communicate with at least one remote device 436 and may further include or be replaced with a controller 432 and a sensor assembly 434 including at least one sensor. The controller 432 includes a processor 437, a memory storage device 435, and circuitry 433. The processor 437 is configured to execute commands to control operation of the drive motor 440 in response to one or more user inputs and/or sensor inputs from the sensor assembly 434. The memory storage device 435 is coupled communicatively to the processor 437 and stores instructions that are executable by the processor 437. The circuitry 433 interconnects each of the components of the controller 432, the sensor assembly 434, and the drive motor 440 to allow the communication of commands and/or data there between. The controller 432 also includes one or more transceivers 439 and/or antennas 438 to allows wireless communication with at least one remote device 436 such as a smart phone, computer, tablet or remote control utilized by one or more users to provide operating inputs to the animal feeder system 100.

The control system 430, including the controller 432, may activate the drive motor 440 in response to one or inputs from the user's remote device 436, such as the user's phone. The user inputs can include an input setting a specific time(s) or date (or both) to actuate the drive motor 440. The selected time(s) may be recorded in the memory storage device 435 or in the timer 470.

The controller 432 may also automatically operate the drive motor 440 in response to one or more sensed conditions from the sensor assembly 434. For example, the sensor assembly 434 may include one or more of a photodiode, photoresistor, phototransistor, or photovoltaic light sensor to detect sunrise and sunset conditions. In response to a determination that sunrise has occurred, the controller 432 may be configured to output a command to the drive motor 440. In response to a determination that sunset has occurred, the controller 432 may be configured to output a commend to the drive motor 440. The sensor assembly 434 may include a motion sensor and the controller 432 may actuate drive motor 440 in response to sensed motion, or lack thereof, around the animal feeder system 100. In another example, the sensor assembly 434 includes at least one camera that takes still pictures and/or video of the desirable, preferred animal DPA that has triggered the sensor assembly 434 to operate the drive motor 440. The camera of the sensor assembly 434 takes still pictures and/or video of the desirable, preferred animal DPA as it is consuming feed from the animal feeder system 100, as well as images of the DPA approaching and departing the animal feeder system 100. These images of the DPA include a location, date and time stamp, which are then stored in the memory storage device 435 as an "Alert Event." The controller 432, namely the transceiver 439 and the antenna 438, transmit an "Alert" to the user's remote device 436 along with the Alert Event details and any pictures and/or video of the DPA.

The sensor assembly 434 may include one or more weather-related sensors (i.e. a barometer, rain gauge, temperature sensor, humidity sensor, etc.) and the controller 432 may actuate drive motor 440 in response to favorable weather (i.e. no rain) or instruct the controller to delay actuation of the drive motor 440 in response to unfavorable weather (i.e. rain). Information from a database related to weather may be sent to the control system 430, including the controller 432, such that it may selectively operate the drive motor 440 in response to the information.

Figure 6:
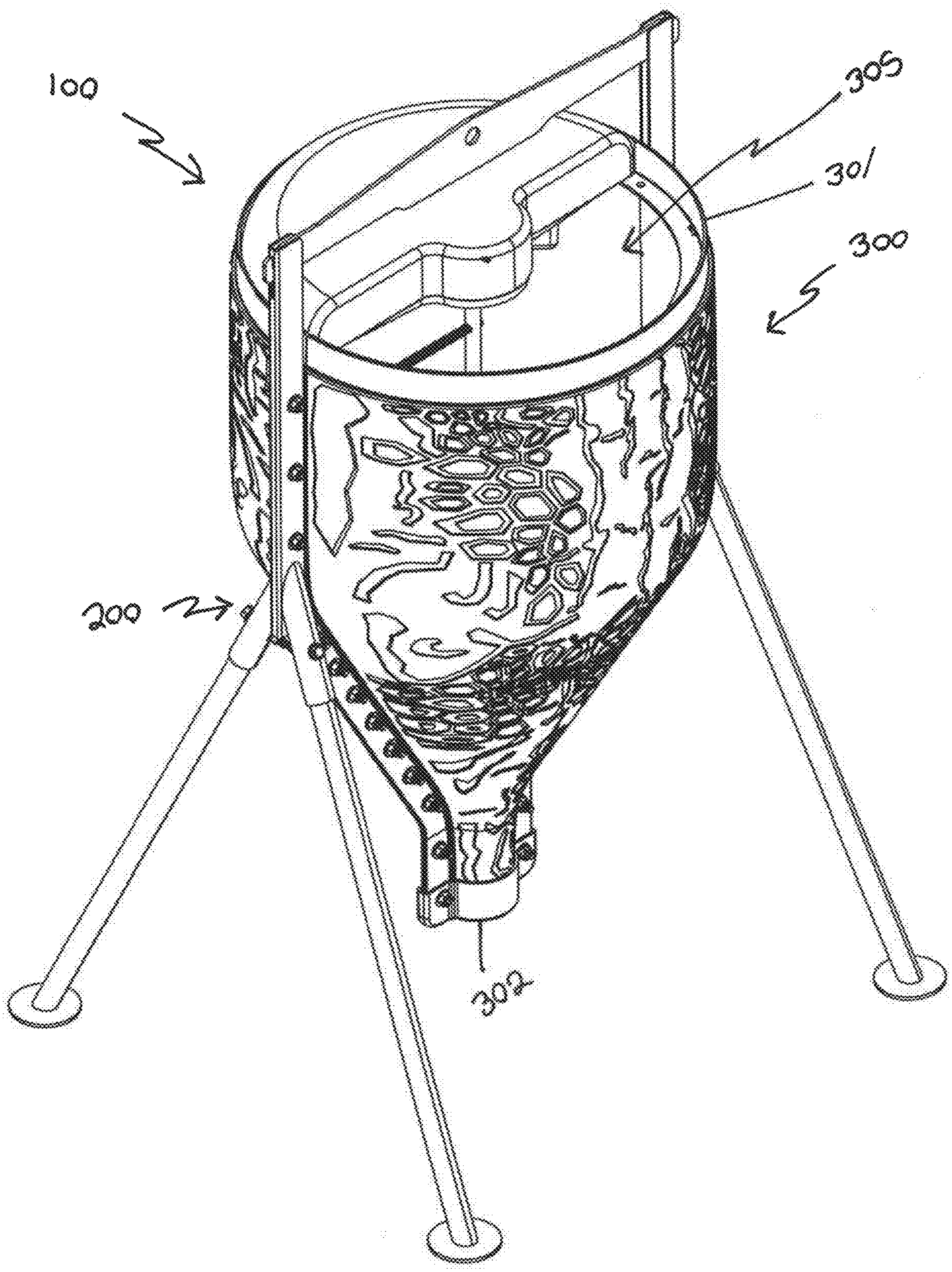
FIG. 6 is a perspective view of the animal feeder system of FIG. 1, wherein a lid is hidden to show a partial view of an interior of a feed reservoir.

The components of the drive assembly 400 are protected in the illustrated embodiment by drive cover 422, shown displaced for illustrative purposes in the exploded view of FIG. 8, and illustrated in place in the lid-less perspective view of FIG. 6. Drive cover 422 prevents feed from interfering with the components of drive assembly 400 when filling the feed storage chamber 305 with feed to be dispersed, and in at least some embodiments the drive cover 422 forms a non-permeable seal with drive frame 420 to prevent moisture incursion. However, various components of the drive assembly need not necessarily be confined beneath drive cover 422. By way of example, switch 431 for actuating the drive motor 440 may be located outside of the drive cover 422, including elsewhere within or on the outside of housing assembly 300.

D. Agitation Assembly

Figure 13A:
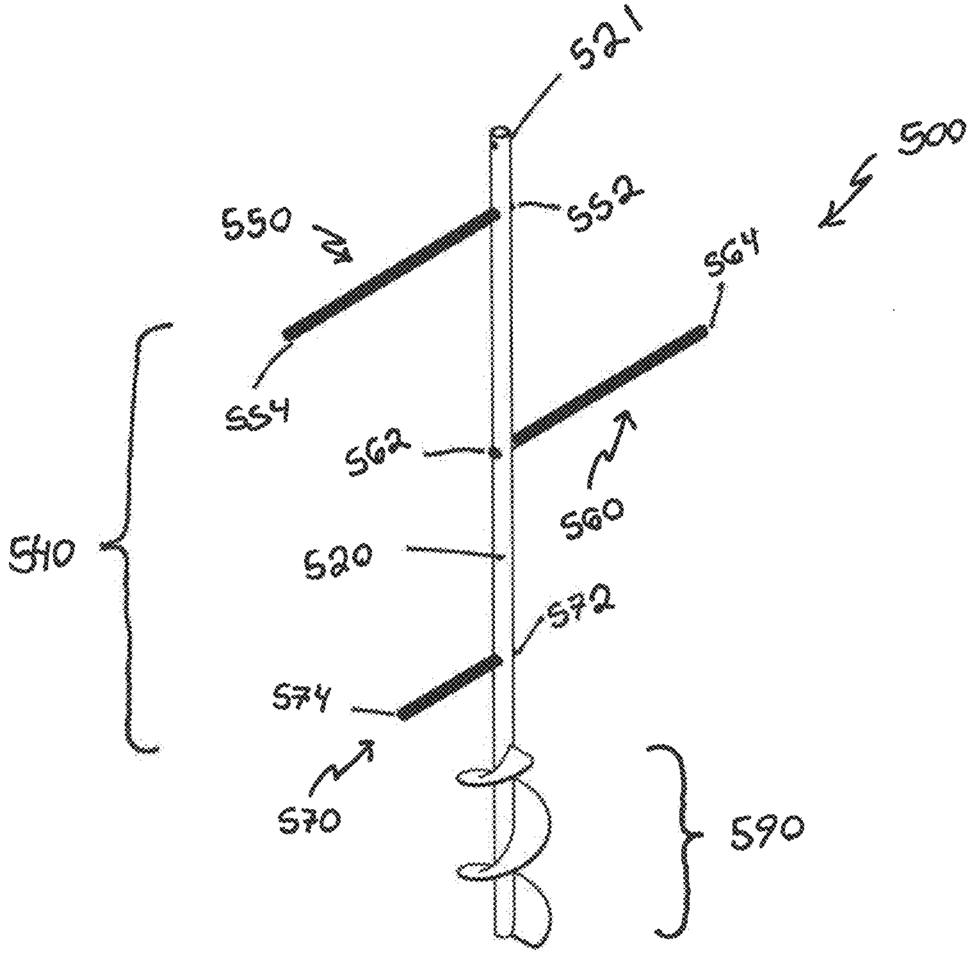
FIG. 13A is a perspective view of an agitation assembly of FIG. 8, which includes a plurality of spring arms, a plurality of spring arm supports, and a drive shaft.
Figure 13B:
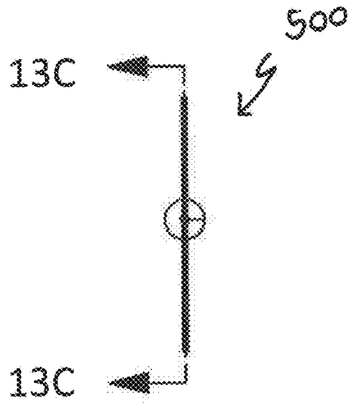
FIG. 13B is a top view of the agitation assembly of FIG. 13A.
Figure 13C:
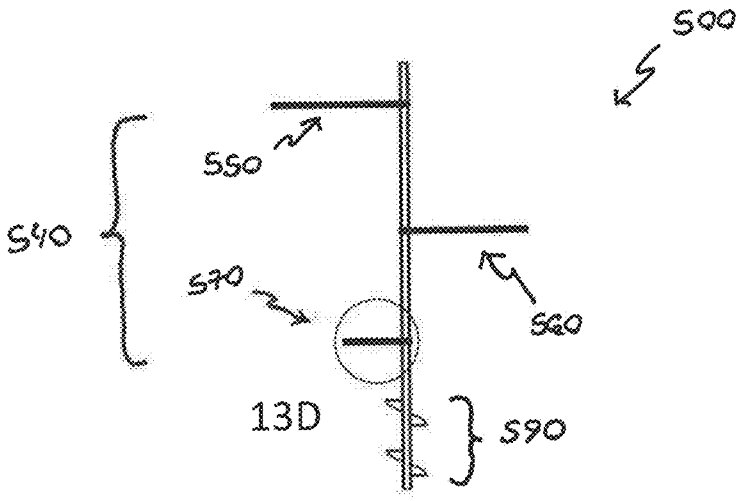
FIG. 13C is a cross-sectional view of the agitation assembly taken along line 13C-13C of FIG. 13B.
Figure 13D:
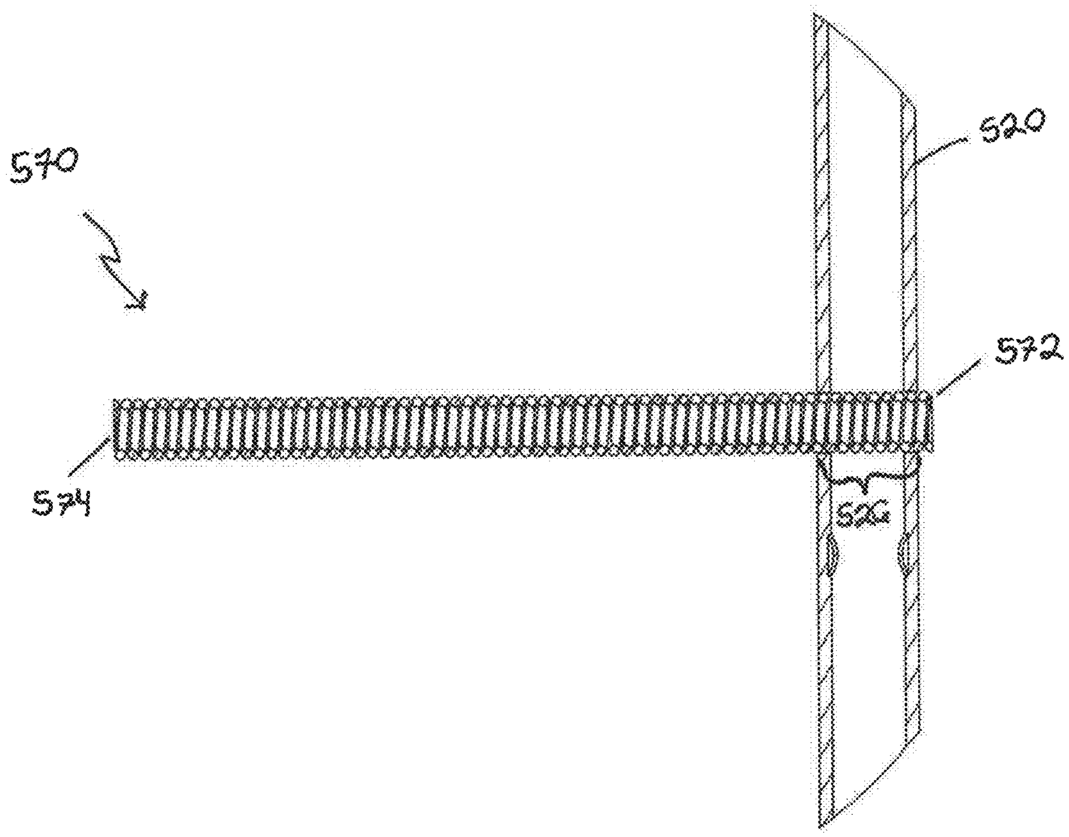
FIG. 13D is a zoomed-in view of a third spring arm of the plurality of spring arms, a fourth spring arm support of the plurality of spring arm supports, and the drive shaft of FIG. 13C.

An agitation assembly 500 is operatively connected to the drive assembly 400, through connection between a drive-shaft coupler interface 521 (see FIG. 13A) and the driveshaft coupler 450 of drive assembly 400 (see FIG. 12B). As depicted in at least FIGS. 7, 9, and 10A, the agitation assembly 500 coupled to the drive assembly 400 resides within the feed storage chamber 305 formed by the side wall arrangement 360 of the housing assembly 300. The agitation assembly is configured to prevent feed F from adhering to itself, avoiding an undesirable "clumping" process whereby feed is more difficult to dispense, and less attractive to a DPA. This is beneficial because the feeder system 100 is able to dispense feed of a semi-homogeneous consistency, and further the feeder system is able to utilize a drive motor 440 of a lower torque, allowing the feeder system 100 to utilize less overall power and operate at a greater efficiency than known feeders. This represents a substantial improvement over conventional feeders in the art that lack agitation assemblies, which dispense less-homogeneous feed and thus require a user or operator to change feed F within a hopper or cavity frequently in order to avoid clogging a feeder system.

Figure 7:
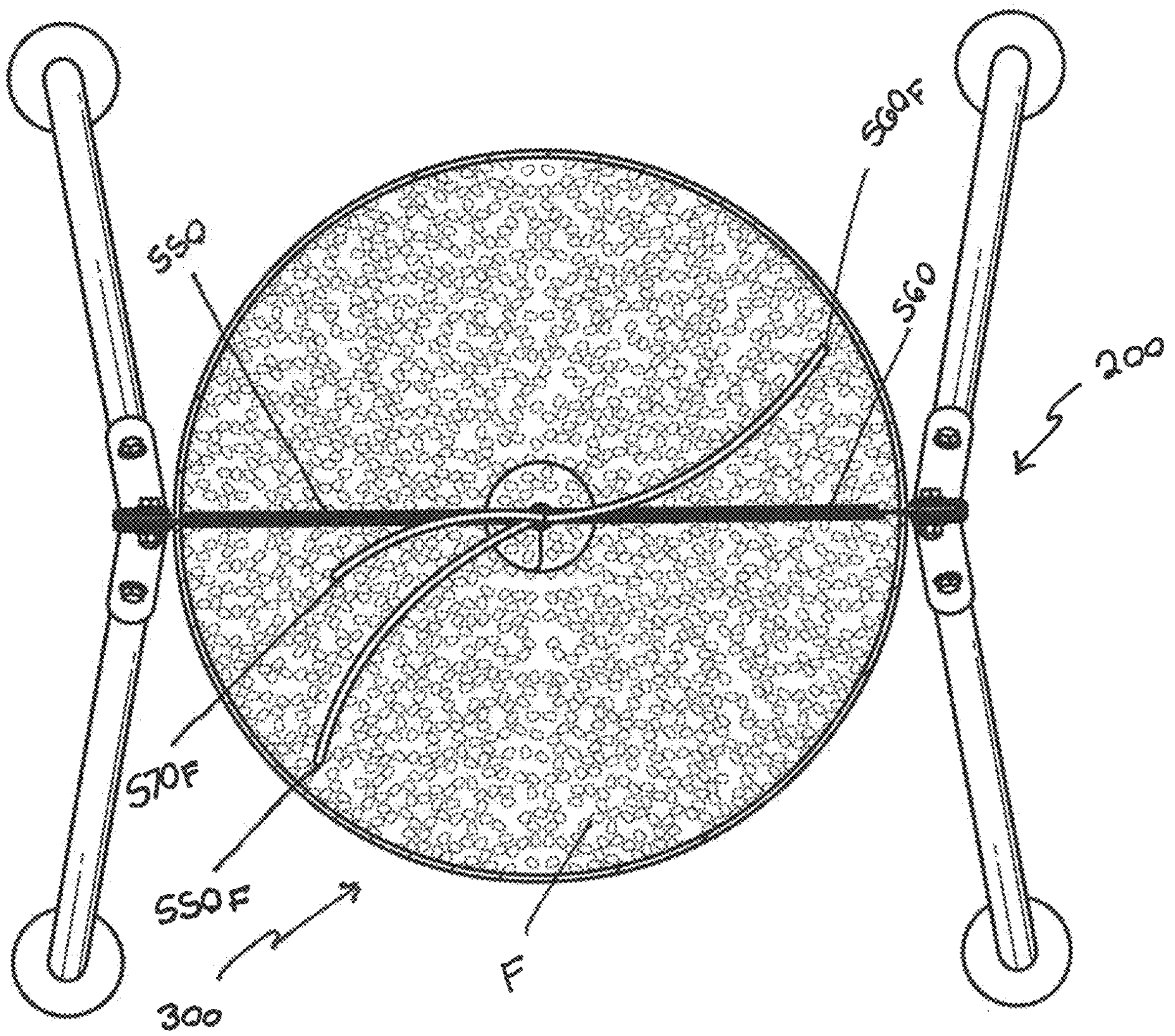
FIG. 7 is a cross-sectional view of the animal feeder system taken along line 7-7 of FIG. 3, and showing partially transparent feed disposed within the cavity along with a first plurality of spring arms in an original state and a second plurality of spring arms in a flexed state $S_F$.

An agitation assembly 500 as illustrated in at least the embodiments of FIGS. 7, 9, and 10 is shown affixed to the drive assembly 400 in FIG. 11A, and isolated in FIG. 13. As depicted in FIG. 13A, an agitation assembly is based about a driveshaft 520, having a coupler interface 521 to couple to the drive assembly 400 at an upper end. The driveshaft 520 further has a plurality of spring arm apertures 522, 524, and 526, collectively interfacing with a spring arm assembly 540. At the end of the drive shaft 520 opposite coupler interface 521, an auger assembly 590 includes a fixed auger blade 592.

The spring arm assembly 540 includes a plurality of spring arms 550, 560, 570 in the embodiment of FIGS. 13. As shown in FIG. 13A, the spring arms 550, 560, and 570 are staggered about the axis of the drive shaft 520, and inserted through spring arm apertures 522, 524, and 526. This relationship is illustrated in detail section view 13D, whereby the lowermost spring arm, 570, is shown inserted by its first end 572 through spring arm aperture 526, which extends through drive shaft 520. Further, as shown in FIGS. 13A and 13C, this relationship is true of the remaining spring arms 550, 560, 570, such that the first end 552 of first spring arm 550 is inserted through spring arm aperture 522, and the first end 562 of second spring arm 560 is inserted through spring arm aperture 524. By inserting spring arms 550, 560, 570 through spring arm apertures 522, 524, and 526, the spring arms 550, 560, 570 are held securely in place when forces applied by the relative motion of the feed and the drive shaft act on the spring arms 550, 560, 570. According to at least the illustrated embodiment, inserting the spring arms 550, 560, 570 through the drive shaft allows the spring arms to be held in place by welding said spring arms 550, 560, 570 to the drive shaft 520. In other embodiments, the spring arms 550, 560, 570 may be only welded to the drive shaft 520 without being inserted through said spring arm apertures 522, 524, and 526. Additionally, in other embodiments the spring arms 550, 560, 570 may be secured to the drive shaft 520 using clips, hooks, threads, or any other similar type of mechanical or chemical attachment mechanism. Still in other embodiments, said the spring arms 550, 560, 570 may be integrally formed with the drive shaft 520 using a 3D printing, molding, or casting method of formation.

Further, while FIG. 13 display three spring arms 550, 560, 570, any number of spring arms 550, 560, 570 from 1 to 200 are contemplated by this disclosure. However, it should be understood that the number of spring arms 550, 560, 570 should be should be balanced with the type/density of the feed and propensity to clump. While the spring arms of the illustrated embodiment are offset from one another by 180 degrees, spring arms 550, 560, 570 may be offset from one another by any angle, including 45 and 90 degrees, and/or can be tailored to the shape of the feed storage chamber 305 within the housing assembly 300.

Figure 10A:
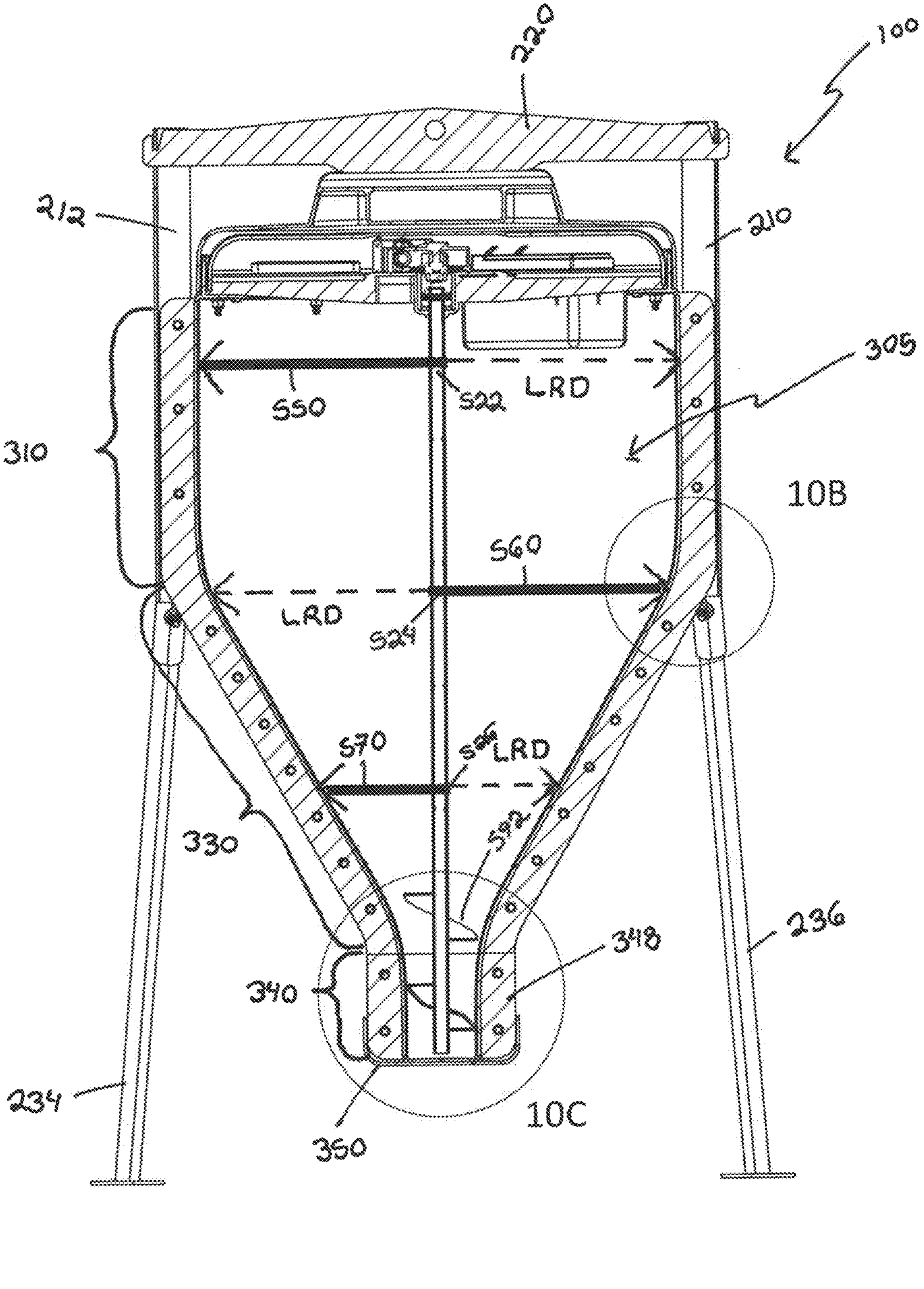
FIG. 10A is a cross-sectional view taken along line 10-10 of FIG. 4, showing the agitation assembly nested within the housing assembly.

The relationship between this spring arm assembly 540 of this illustrated embodiment and the housing assembly 300 is depicted in FIG. 10. Driveshaft 520 extends through each of the upper portion 310, middle portion 330, and lower portion 340 of the housing assembly 300, with the spring arm assembly 540 operative in upper portion 310 and middle portion 330. The auger assembly 590 occupies the lower portion 340. As addressed above with respect to the housing assembly 300 generally, the difference in diameter between the substantially cylindrical housing portions 310 and 340 results in a frustoconical middle portion 330, meaning that if each spring arm 550, 560, 570 of the spring arm assembly 540 were the same length, said spring arms 550, 560, 570 would terminate at different distances from the side wall arrangement 360. As such, the lengths of spring arms 550, 560, 570 are coordinated with local reference distances (LRDs) as shown in FIG. 10A, where these local reference distances are aligned with an intersect the spring arms 550, 560, 570. The local reference distances are coplanar with the spring arms 550, 560, 570, such that the local reference distances reside in the same horizontal plane that the spring arms reside in, extending between the interior surfaces 366(*a*), 368(*a*).

Figure 10B:
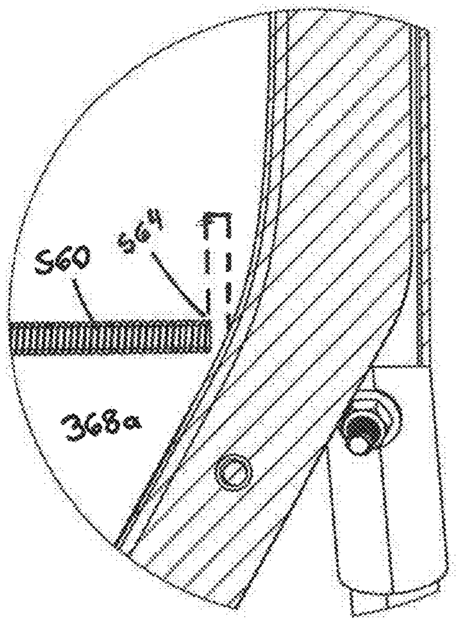
FIG. 10B is a zoomed-in view of FIG. 10A showing a spaced relationship between a spring arm of the agitation assembly and an interior surface of a middle portion $P_M$ of the reservoir.

As shown in detail view FIG. 10B, a desired arrangement of second spring arm 560 is shown with a second end 564 at a distance D1 from the interior surface 368(*a*) of second wall 368. Similar relationships exist between the second end 554 of the first spring arm 550 and the interior surface 368(*a*) of the second wall 368, and the second end 564 of the second spring arm 560 and the interior surface 368(*a*) of the second wall 368. Depending on the position of the drive motor 440, and accordingly the rotational position of the drive shaft 520, these spaced relationships between the second ends 554, 564, and 574 and the interior surfaces of the side wall arrangement 360 can also be measured with respect to inner surface 366(*a*) of first wall 366. According to some embodiments, distance D1 is between about 1 mm and about 3 mm. However, in other embodiments the distance D1 may be between 0.01 mm and 1 mm, or between 3 mm and 5 mm.

Figure 10C:
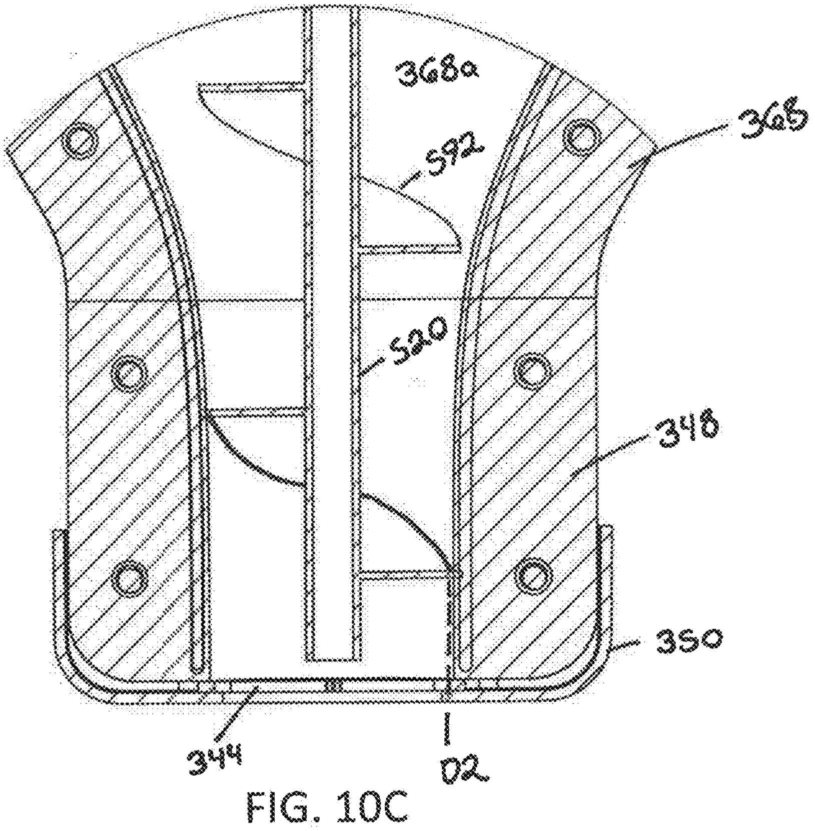
FIG. 10C is a zoomed-in view of FIG. 10A showing an auger of the agitation assembly within a lower portion $P_L$ of the reservoir.

Similarly, the detail view of FIG. 10C shows a spaced relationship D2 between the auger blade 592 and the interior surfaces 346(*a*) and 348(*a*) of first and second nozzle frames 346 and 348 in the lower portion 340 of the housing assembly. This particular arrangement of the nozzle frames 346 and 348, the assembly thereof shown in the exploded view of FIG. 8, need not be present for all embodiments of a nozzle assembly, and thus in at least some embodiments this spaced relationship of FIG. 10C reflects a distance between the auger blade 592 and the interior surfaces 366(*a*) and 368(*a*) of the side wall arrangement 360. According to some embodiments, distance D2 is so minute that the auger blade 592 effective contacts the relevant interior surface, as shown in FIG. 10C. In some alternative embodiments, the distance D2 may be less than 1 mm. In some alternative embodiments, a bearing or other securing mechanism may be added to secure the drive shaft to the housing near the end of the drive shaft having the auger. Further, auger assemblies such as auger assembly 590 may generally be tailored to the type of feed F contained within the feed storage chamber 305. For powdered feeds (having smaller nominal particle diameters), the auger assembly may have a higher density of spirals in the auger blade. By contrast, for feeds having larger nominal particle diameters, such as corn, the auger assembly may have a lower density of spirals in the auger blade.

According to the illustrated embodiments, the distance of spaced relationship D2 is less than the distance of spaced relationship D1. By minimizing the distance D2 between the auger blade 592 and its surroundings, feed F found in feed storage chamber 305 is unable to pass from feed storage chamber 305 out of the nozzle 344 of the dispensing outlet assembly 342 unless auger blade 592 is actuated by drive motor 440. However, spring arm assembly 540 serves the purpose of agitating feed F when the drive motor 440 is actuated, and the spaced relationship D1 between the second ends 554, 564, and 574 of the interior surfaces 366(*a*) and 368(*a*) of the side wall arrangement 360 serves to maximize the reach of the spring arms 550, 560, 570 through feed F while avoiding unwanted friction between second ends 554, 564, and 574 of the interior surfaces 366(*a*) and 368(*a*) of the side wall arrangement 360.

As the drive motor 440 of the drive assembly 400, and thus the corresponding drive shaft 520 of the agitation assembly 500, rotates, the spring arm assembly 540 is displaced by the effective viscosity of the feed F within the feed storage chamber 305. This principle of effective viscosity creates a drag on the spring arms 550, 560, 570, whereby the many particles of solid feed F in the feed storage chamber 305 exert a torque on those spring arms 550, 560, 570 such that the greater the displacement along the length of the spring arm, the greater the displacement of that point of the spring arm from its natural position. Put another way, the spring arm assembly 540 exhibits behavior similar to that of a rotational viscometer. This principle is illustrated by the expository cross-sectional view of FIG. 7, which shows solid feed disposed within the feed storage chamber 305 as partially transparent feed to demonstrate the states of the spring arms 550, 560, 570 during the operation of feeder system 100.

As shown in FIG. 7, the first plurality of spring arms 550 and 560 (spring arm 570 is obscured in this view and state by spring arm 550) in an original state. In said original state, the first plurality of spring arms 550 and 560 are in a linear arrangement and are positioned 180 degrees from one another. A second flexed state $S_F$ of these same spring arms (550$_F$, 560$_F$, 570$_F$) is also shown, where the coils of the spring arms are removed for the purpose of showing contrast. In said second flexed state $S_F$, the spring arms are in a parabolic or near parabolic deformed state. The two longer spring arms, 550 and 560, show a greater deviation from their original, non-flexed positions than the shorter spring arm 570. This results from the overall force applied to the spring arm by the feed bring greater as the distance along that spring arm increases, while the spring arm remains connected in a single unit. In contrast, the shorter spring arm 570 shows a significantly lower deviation from its original position to that of 570$_F$, as both the overall force, and the force at any given point, along the shorter spring arm is lesser due to its comparatively limited length. Unlike actual viscous fluids, which would slowly allow the spring arms 550, 560, 570 to eventually return to their original positions of the non-flex state over time, the particulate matter of solid feed imparts additional resistance due to internal friction between the feed particles not present in true fluids at this scale. Thus, as the feeder system 100 operates, the spring arms 550, 560, 570 often remain in a flexed state 550$_F$, 560$_F$, 570$_F$ even when the drive motor 440 is not in motion.

Each of spring arms 550, 560, 570 can have an elasticity value reflecting its overall tendency to deviate toward a flexed state which is dependent upon a variety of design factors, including the lengths and diameters of the spring arms 550, 560, 570, the local reference distances coplanar to each of spring arms 550, 560, 570, and the type of feed F in the feed storage chamber 305. The elasticity of the spring arms is proportional to the local reference distance coplanar to that spring arm, and may be directly proportional, inversely proportional, direct square proportional, or inversely square proportional to the local reference distance coplanar to that of the spring arm.

In the illustrated embodiment of FIG. 7, each spring arm 550, 560, 570 represents a steel coil spring having a diameter of approximately 9.5 mm crafted from spring wire having a diameter of approximately 2.2 mm. Other spring diameters and wire diameters that are greater and smaller than 9.5 and 2.2 mms are contemplated by this disclosure. Examples of these other diameters range from 1 mm to 35 mm.

While the embodiments of FIGS. 7, 10, 11, and 13 show spring arms in the form of coil springs, other spring arms such as leaf springs or solid rod springs are contemplated by this disclosure. The coil spring arms of the embodiments of FIGS. 7, 10, 11, and 13 allow for efficient agitation without requiring a high-torque drive motor 440, as the spring arms 550, 560, and 570 are able to bend in the flexed state $S_F$ to avoid stressing drive motor 440. In other words, it is desirable to utilize coil spring arms as opposed to other types of spring or ridge projections (e.g., metal or plastic) due to the coil spring arms ability to deform and then return to its original position. Nevertheless, it should be understood that this disclosure is not limited to the use of a coil spring arm and instead may be any type of projection that extends from the drive shaft 520 that can be temporarily deformed by forcing said projection through the feed F using the drive motor 440.

The deformation of said spring arms or projection is based on the feed type/density of the feed, the RPM rate of the motor, and the properties of the projection. If a larger deformation is desirable (e.g., to allow for larger chucks of feed to exist), then a less ridged projection may be used while keeping the RPMs and type/density of the feed constant. If less deformation is desirable (e.g., helping to ensure that no chucks of feed exist), then a more ridged projection or a high RPM motor may be used while keeping the type/density of the feed constant. If it is desirable to increase the RPMs of the motor while not dispensing a lot of feed, it should be understood that the density of spirals associated with the auger may be increased or the drive shaft may be made from two components (e.g., the outside drive shaft that is directly connected to the spring arm or projection may rotate at the motor speed and a gear reduction may be used to drive an internal drive shaft that is coupled to the auger).

E. Alternative Agitation Assembly

In addition to the agitation assembly of FIGS. 13, several alternative agitation assemblies having varying configurations of spring arm and auger assemblies are within the scope of this disclosure. By way of example, FIG. 14 depict an alternative agitation assembly 1500, based about a driveshaft 1520 having a coupler interface 1521 for operatively coupling to a drive assembly such as drive assembly 400. Opposite coupler interface 1521 along the length of driveshaft 1520 is alternative auger assembly 1590, characterized by an alternative auger blade 1592. Between alternative auger assembly 1590 and coupler interface 1521 is alternative spring arm assembly 1540.

Figure 14A:
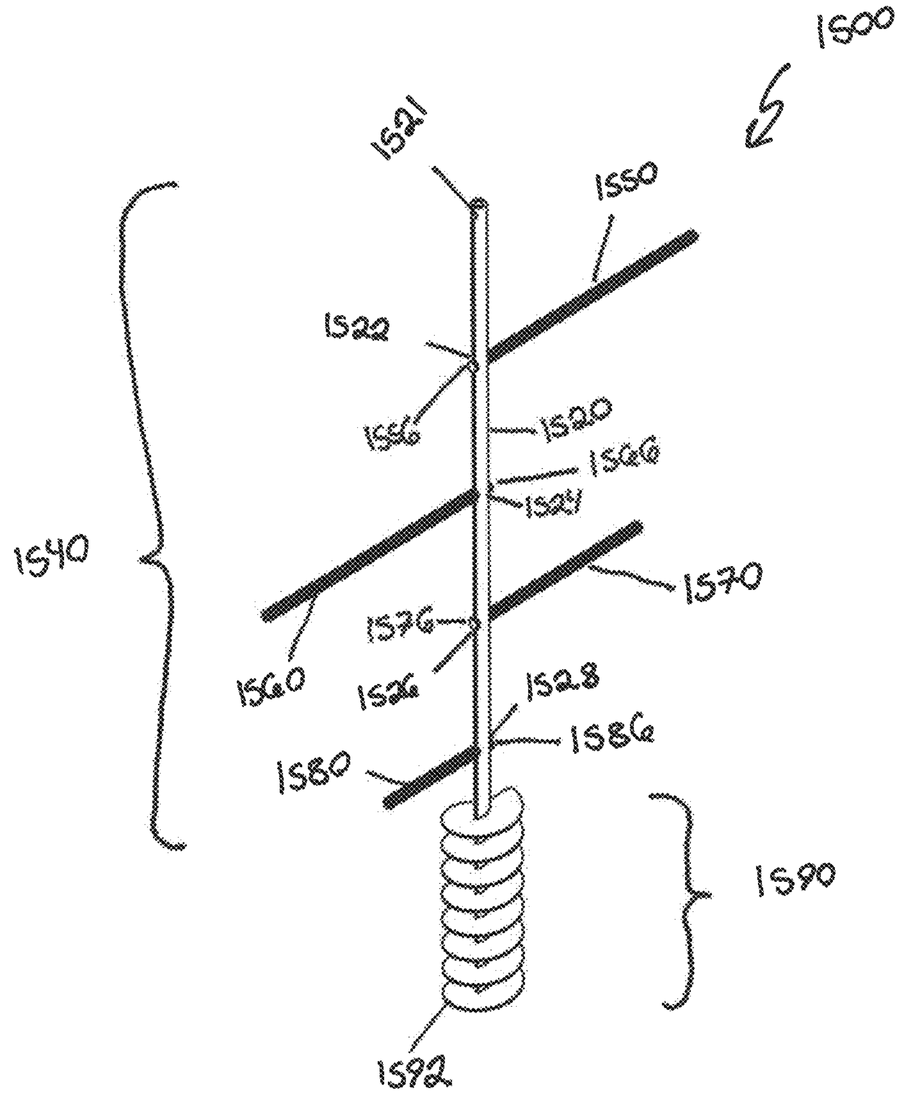
FIG. 14A is a perspective view of an alternative agitation assembly, which includes a plurality of spring arms, a plurality of spring arm supports, and a drive shaft.
Figure 14B:
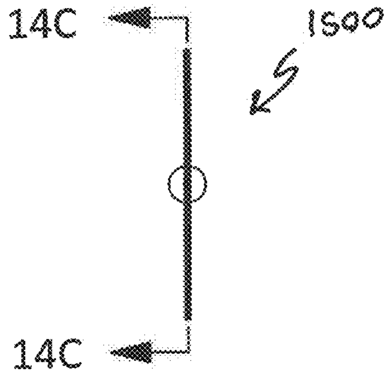
FIG. 14B is a top view of the alternative agitation assembly of FIG. 14A.

In the illustrated embodiment of FIGS. 14, FIG. 14A depicts each of first, second, third, and fourth alternative spring arms 1550, 1560, 1570, and 1580 dispersed along the axis of alternative auger assembly 1590, corresponding to spring arm support apertures 1522, 1524, 1526, and 1528. Detail view 15D shows an exemplary interface between fourth alternative spring arm 1580 and alternative driveshaft 1520, whereby a fourth alternative spring arm support 1588, having a broader first end 1588 and narrower second end 1589, is disposed through spring arm support aperture 1528. The broader first end 1588 of the fourth alternative spring arm support 1586 is sized to prevent the fourth alternative spring arm support 1586 from being pulled through spring arm support aperture 1528 according to the illustrated embodiment, though in other embodiments a spring arm support may be secured to a driveshaft through welding, be integrally formed as part of the driveshaft, or other methods familiar to one of skill in the art of fastening metals.

The fourth alternative spring arm 1580 surrounds the fourth alternative spring arm support 1586, as shown in detail section view 15D. In this configuration, the first end of fourth alternative spring arm support 1586 is illustrated as not contacting the alternative drive shaft 1520, though in other embodiments the first end of fourth alternative spring arm support 1586 may abut the alternative drive shaft 1520.

Figure 14C:
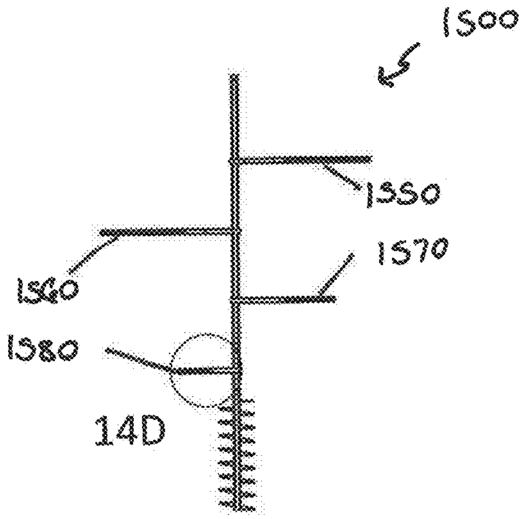
FIG. 14C is a cross-sectional view of the alternative agitation assembly taken along line 14C-14C of FIG. 14B.
Figure 14D:
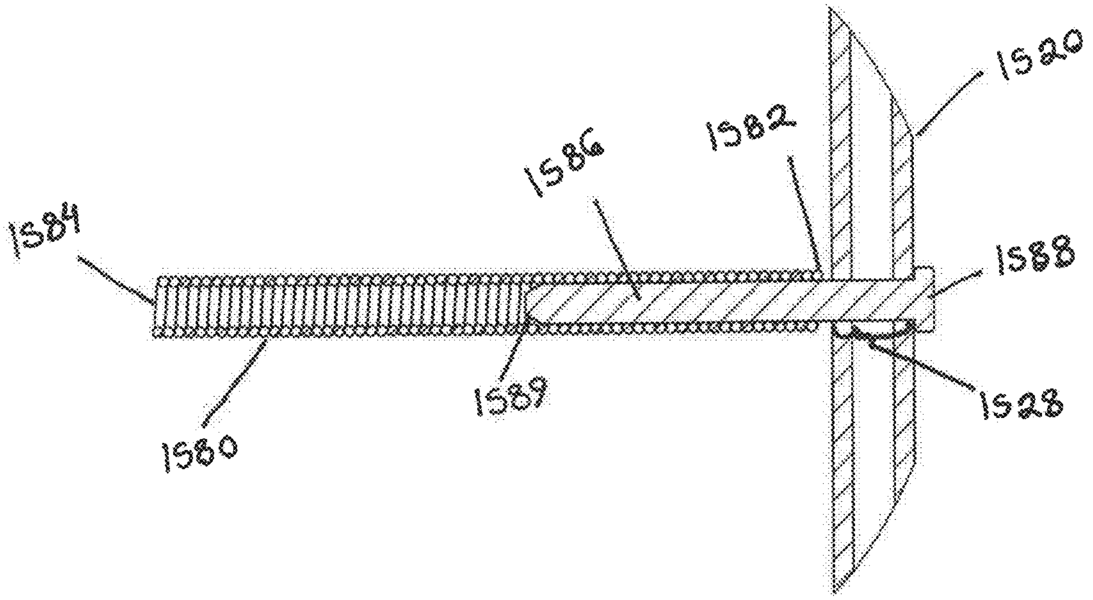
FIG. 14D is a zoomed-in view of a fourth spring arm of the plurality of spring arms, a fourth spring arm support of the plurality of spring arm supports, and the drive shaft of FIG. 14C.

As with the agitation assembly 500 described above, alternative agitation assembly 1500 is equipped with alternative spring arms that are of different lengths in order to maximize agitation of feed F within the confines of feed storage chamber 305, including in the substantially frustoconical middle portion 330. In alternative agitation assembly 1500, first and second alternative spring arms 1550 and 1560 are depicted as having the same overall length, as shown in FIG. 14C. However, each of the third and fourth alternative spring arms, 1570 and 1580, are shorter than the first and second alternative spring arms 1550 and 1560, and fourth alternative spring arm 1580 is shorter than third alternative spring arm 1570.

By way of illustration, FIG. 15 depicts a perspective view of both the first alternative spring arm 1550, and its corresponding first alternative spring arm support, independent from alternative drive shaft 1520. These alternative spring arms come in a plurality of lengths as necessary to fit the dimensions of the feed storage chamber 305; however, the corresponding alternative spring arm supports, paired with these alternative spring arms, can be used to create a plurality of spring elasticities to optimize an alternative spring arm assembly 1540 within a particular feed storage chamber 305 based on the type of feed F, depth of the alternative spring arm within feed storage chamber 305, and the cross section of feed storage chamber 305 at that depth.

In the embodiment depicted in FIGS. 16-18, this principle is demonstrated with respect to alternative spring arm assembly 1540. FIG. 16 show first alternative spring arm 1550, surrounding first alternative spring arm support 1556, where FIG. 16B shows a section view such that the comparative lengths of each component as readily visible. The distance $\mathbf{16}_{L1}$ between the first end of first alternative spring arm 1552 and the second end 1559 of the first alternative spring arm support 1556 is significantly less than the distance $\mathbf{16}_{L2}$ between the second end 1559 of the first alternative spring arm support 1556 and the second end 1554 of the first alternative spring arm 1552. By contrast, as shown in FIGS. 17, even though the overall length of third alternative spring arm support 1576 is identical to that of first alternative spring arms support 1556, the distance $\mathbf{17}_{L2}$ between the second end 1579 of second alternative spring arm support 1576 and the second end 1574 of the second alternative spring arm 1570 is significantly less than $\mathbf{16}_{L2}$. Further, distance $\mathbf{17}_{L2}$ is approximately equal to the distance $\mathbf{17}_{L1}$ between the first end 1572 of the second alternative spring arm 1570 and the second end 1579 of second alternative spring arm support 1576. FIG. 18 depict the fourth alternative spring arm 1580 and corresponding fourth alternative spring arm support 1586, where the distance $\mathbf{18}_{L1}$ between the first end 1582 of the fourth alternative spring arm 1580 and the second end 1589 of the fourth alternative spring arm support 1580 is slightly less than the distance $\mathbf{18}_{L2}$ between the second end 1589 of the fourth alternative spring arm support 1580 and the second end 1584 of the fourth alternative spring arm 1584.

By varying the distances $\mathbf{16}_{L1}$, $\mathbf{17}_{L1}$, and $\mathbf{18}_{L1}$, in relation to distances $\mathbf{16}_{L2}$, $\mathbf{17}_{L2}$, and $\mathbf{18}_{L2}$, the alternative spring arm assembly 1540 is able to have spring arms that vary the effective spring elasticity at various points radially along the combination of alternative spring arms 1550, 1560, 1570, 1580, and alternative spring arm supports 1556, 1566, 1576, and 1586. According to some alternative embodiments, the effective elasticity of the combination of the alternative spring arms and spring arm supports is proportional to the local reference distance coplanar to that spring arm and spring arm support, and may be directly proportional, inversely proportional, direct square proportional, or inversely square proportional to the local reference distance coplanar to that of the spring arm. This effective alternative spring arm and alternative spring arm support elasticity may vary dependent on a variety of design factors, including the length and diameter of the alternative spring arm and its materials, the length and diameter of the alternative spring arm support and tis materials, and the extent of the insertion of the alternative spring arm support into the alternative spring arm.

F. Alternative Dispensing Outlets

In addition to the dispensing outlet assembly 342 deconstructed in at least the exploded view of FIG. 8, FIGS. 19A and 19B provide alternative nozzle assemblies for use with both the dispensing outlet assembly 342 or alternative feed dispensing outlets which accept the illustrated nozzles or variants thereof. In a first alternative dispensing outlet assembly 1420, a first alternative nozzle 1440 is comprised of a collar 1470 with a plurality of interior brushes 1445. In the illustrated first alternative embodiment, depicting a top view of the first alternative nozzle 1440, collar 1470 is tapered from a top collar edge 1471 to a bottom collar edge 1472, such that feed F passing through brushes 1445 is further compressed as feed F passes through the collar 1470. In other variations of collar 1470, there is not taper, such that top collar edge 1471 and bottom collar edge 1472 are of the same diameter.

In another, second alternative dispensing outlet assembly 2420, a second alternative nozzle 2440 is provided further having a spaced nozzle cover 2445. This spaced relationship between the spaced nozzle cover 2445 and the second alternative nozzle 2440 is advantageous for dispensing types of feed which have a larger representative particulate cross-section, and in particular feed with too large of a nominal particle size to easily dispense through a slotted nozzle such as nozzle 344.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure. It is to be understood that the invention is not limited to the exact details of construction, operation, exact materials or embodiments shown and described, as obvious modifications and equivalents will be apparent to one skilled in the art. Accordingly, the invention is therefore to be limited only by the scope of the appended claims. While the specific embodiments have been illustrated and described, numerous modifications come to mind without significantly departing from the spirit of the invention, and the scope of protection is only limited by the scope of the accompanying Claims.

The invention claimed is:

1. An animal feeder system, the animal feeder system comprising:

a housing having a first housing wall and a second housing wall that define a feed storage chamber, the housing also having a dispensing outlet formed in a lowermost portion of the storage chamber, the housing assembly further having a lid to removably enclose the storage chamber;

a drive assembly having a drive frame, a drive motor, a driveshaft coupler, and a controller;

an agitation assembly having a rotatable driveshaft extending between an upper end and an opposite end, the upper end being coupled to the driveshaft coupler of the drive assembly, a plurality of spring arms extending radially outward from the driveshaft, and an auger blade secured to the drive shaft, wherein the plurality of spring arms is positioned along the driveshaft between the auger blade and the upper end;

wherein each spring arm of the plurality of spring arms has a spring arm elasticity value that is proportional to a local reference distance extending between the first housing wall and the second housing wall, wherein the local reference distance is aligned with said spring arm.

2. The animal feeder system of claim 1, wherein the feed storage chamber has an upper portion and a middle portion, and at least two spring arms of the plurality of spring arms are located in the upper portion.

3. The animal feeder system of claim 2, wherein the middle portion of the feed storage chamber has a substantially frustoconical shape.

4. The animal feeder system of claim 1, wherein a separation distance between a distal end of an uppermost spring arm of the plurality of spring arms and an interior surface of an upper portion of the feed storage chamber is less than 3 mm.

5. The animal feeder system of claim 1 wherein a separation distance between a distal end of an intermediate spring arm of the plurality of spring arms and an interior surface of an upper portion of the feed storage chamber is less than 3 mm.

6. The animal feeder system of claim 1, wherein a separation distance between a distal end of a lowermost spring arm of the plurality of spring arms and an interior surface of an middle portion of the feed storage chamber is less than 3 mm.

7. The animal feeder system of claim 1, wherein the spring tension value of an uppermost spring arm is greater than the spring tension value of an intermediate spring arm.

8. The animal feeder system of claim 1, wherein each spring arm of the plurality of spring arms has an interior end portion that extends through the driveshaft.

9. The animal feeder system of claim 1, wherein each spring arm of the plurality of spring arms has a spring arm support that interfaces with the driveshaft and extends through the spring arm.

* * * * *